US008095417B2

(12) United States Patent
Handy et al.

(10) Patent No.: US 8,095,417 B2
(45) Date of Patent: Jan. 10, 2012

(54) KEY PERFORMANCE INDICATOR SCORECARD EDITOR

(75) Inventors: Stephen Van de Walker Handy, Bremerton, WA (US); Peter Birkedal Peterson, Seattle, WA (US); Brent Wilson, Redmond, WA (US); Corey J. Hulen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 11/877,127

(22) Filed: Oct. 23, 2007

(65) Prior Publication Data

US 2009/0106640 A1   Apr. 23, 2009

(51) Int. Cl.
G06Q 10/00 (2006.01)
G06F 3/048 (2006.01)
(52) U.S. Cl. ....... 705/7.39; 705/7.38; 715/711; 715/769
(58) Field of Classification Search .......................... None
See application file for complete search history.

(56) References Cited

U.S. PATENT DOCUMENTS

| | | | |
|---|---|---|---|
| 5,659,693 A | 8/1997 | Hansen | |
| 6,411,313 B1 * | 6/2002 | Conlon et al. | 715/769 |
| 6,552,727 B2 * | 4/2003 | Stamm | 345/467 |
| 6,684,369 B1 | 1/2004 | Bernardo | |
| 6,738,079 B1 | 5/2004 | Kellerman | |
| 6,745,238 B1 | 6/2004 | Giljum | |
| 6,784,905 B2 | 8/2004 | Brown | |
| 6,995,768 B2 | 2/2006 | Jou et al. | |
| 7,039,871 B2 | 5/2006 | Cronk | |
| 7,523,401 B1 | 4/2009 | Aldridge | |
| 7,546,543 B2 | 6/2009 | Louch | |
| 7,665,028 B2 * | 2/2010 | Cummins et al. | 715/769 |
| 7,716,253 B2 * | 5/2010 | Netz et al. | 707/803 |
| 7,716,592 B2 | 5/2010 | Tien | |
| 7,801,874 B2 | 9/2010 | Bernacki | |
| 7,908,161 B2 * | 3/2011 | Benayon et al. | 705/7.11 |
| 2002/0023111 A1 | 2/2002 | Arora | |
| 2002/0078175 A1 | 6/2002 | Wallace | |
| 2002/0116418 A1 | 8/2002 | Lachhwani | |
| 2003/0117437 A1 | 6/2003 | Cook | |
| 2003/0222898 A1 * | 12/2003 | Macomber et al. | 345/709 |
| 2004/0123238 A1 | 6/2004 | Hefetz | |
| 2004/0183831 A1 | 9/2004 | Ritchy | |
| 2005/0071737 A1 * | 3/2005 | Adendorff et al. | 715/500 |
| 2005/0235293 A1 | 10/2005 | Fortes | |
| 2006/0052884 A1 * | 3/2006 | Staples et al. | 700/83 |
| 2006/0112123 A1 | 5/2006 | Clark | |
| 2006/0161471 A1 | 7/2006 | Hulen et al. | |
| 2006/0161596 A1 | 7/2006 | Chan et al. | |

(Continued)

OTHER PUBLICATIONS

"The Dashboard Spy" (May 31, 2006) (http://dashboardspy.wordpress.com/2006/05/31/).*

(Continued)

Primary Examiner — Lynda Jasmin
Assistant Examiner — Sujay Koneru
(74) Attorney, Agent, or Firm — Merchant & Gould P.C.

(57) ABSTRACT

A user interface is programmed to create a scorecard. The interface includes a scorecard module including a column area and a row area, and a key performance indicator area including a plurality of key performance indicators. A key performance indicator from the key performance indicator area can be dragged and dropped onto one of the column area and the row area to add indicia associated with the key performance indicator to the scorecard.

1 Claim, 26 Drawing Sheets

U.S. PATENT DOCUMENTS

| | | | |
|---|---|---|---|
| 2006/0235778 A1* | 10/2006 | Razvi et al. | 705/35 |
| 2006/0274086 A1 | 12/2006 | Forstall | |
| 2007/0011026 A1 | 1/2007 | Higgins | |
| 2007/0022026 A1* | 1/2007 | Davidson et al. | 705/31 |
| 2007/0050237 A1 | 3/2007 | Tien et al. | |
| 2007/0064012 A1* | 3/2007 | McCall | 345/619 |
| 2007/0067757 A1 | 3/2007 | Amemiya | |
| 2007/0083837 A1 | 4/2007 | Gristede | |
| 2007/0101279 A1 | 5/2007 | Chaudhri | |
| 2007/0113194 A1 | 5/2007 | Bales | |
| 2007/0118793 A1 | 5/2007 | Arora | |
| 2007/0118813 A1 | 5/2007 | Forstall | |
| 2007/0130541 A1 | 6/2007 | Louch | |
| 2007/0143161 A1 | 6/2007 | Tien et al. | |
| 2007/0143174 A1 | 6/2007 | Tien et al. | |
| 2007/0168931 A1 | 7/2007 | Martin | |
| 2007/0239470 A1* | 10/2007 | Ronen et al. | 705/1 |
| 2007/0260582 A1 | 11/2007 | Liang | |
| 2008/0034314 A1 | 2/2008 | Louch | |
| 2008/0127052 A1 | 5/2008 | Rostoker | |
| 2008/0148155 A1 | 6/2008 | Kogan | |
| 2008/0263462 A1 | 10/2008 | Mayer-Ullmann | |
| 2009/0006987 A1 | 1/2009 | Simhi | |
| 2009/0106656 A1 | 4/2009 | Handy | |

OTHER PUBLICATIONS

Microsoft Office Business Scorecard Manager (2003) Microsoft.*

"Microsoft Takes up Scorecarding; Performance Management app aims to maximize Office" (Oct. 31, 2005) eWeek.*

Documentum Web Publisher Page Builder, http://software.emc.com/products/software_az/web_publisher_page_builder.htm, © 2006, 3 pages.

MicroStrategy Products, http://www.sntru.com/Content.Node/solutions/products/Microstrategy/doc-m8i-000-brh-0-000000-010.pdf, © 2006, 12 pages.

Using Reporting Services SharePoint Web Parts in SQL Server 2000 Reporting Services Service Pak 2, http://www.microsoft.com/technet/prodtechnol/sql/2000/maintain/webrssp2.mspx, Apr. 25, 2005, 14 pages.

Scorecards Provide a Foundation for Business Performance management at Microsoft, http://www.microsoft.com/technet/itshowcase/content/scorecardbusperftcs,mspx, Nov. 1, 2005, 8 pages.

ILOG JViews Diagrammer 8.0 the Dashboard Editor, Nov. 2006, 54 pages.

Plan Dashboards and Filters, Nov. 16, 2006, 8 pages.

Valtira, The Simplicis™ Marketing Dashboard Developers' Guide, (admitted prior art as of the filed Oct. 23, 2007) 13 pages.

* cited by examiner

KEY PERFORMANCE INDICATOR SCORECARD EDITOR

BACKGROUND

Key Performance Indicators, also known as KPIs or Key Success Indicators (KSI), help an organization define and measure progress toward organizational goals. Once an organization has analyzed its mission, identified all its stakeholders, and defined its goals, it needs a way to measure progress toward those goals. KPIs are used to provide those measurements.

Scorecards are used to provide detailed and summary analysis of KPIs and aggregated KPIs such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon for organizations to provide their raw performance data to a third party and receive scorecard representations, analysis results, and similar reports.

SUMMARY

According to one aspect, a user interface is programmed to create a scorecard, the interface including a scorecard module including a column area and a row area, and a key performance indicator area including a plurality of key performance indicators. A key performance indicator from the key performance indicator area can be dragged and dropped onto one of the column area and the row area to add indicia associated with the key performance indicator to the scorecard.

According to another aspect, a method for creating a scorecard using a wizard includes: displaying a first screen including a plurality of templates; allowing for selection of one of the plurality of templates; displaying a second screen including a plurality of data sources; allowing for selection of one of the plurality of data sources; displaying a third screen including a plurality of key performance indicators relating to the one selected data source; and allowing for selection of one of the plurality of key performance indicators.

According to yet another aspect, a method for editing a scorecard includes: adding, moving, or removing a key performance indicator from the scorecard by dragging and dropping the key performance indicator item; and updating column and row totals for the scoreboard when the items are added, moved or removed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

The present application is directed to systems and methods for creating and editing scorecards.

Figure 1:
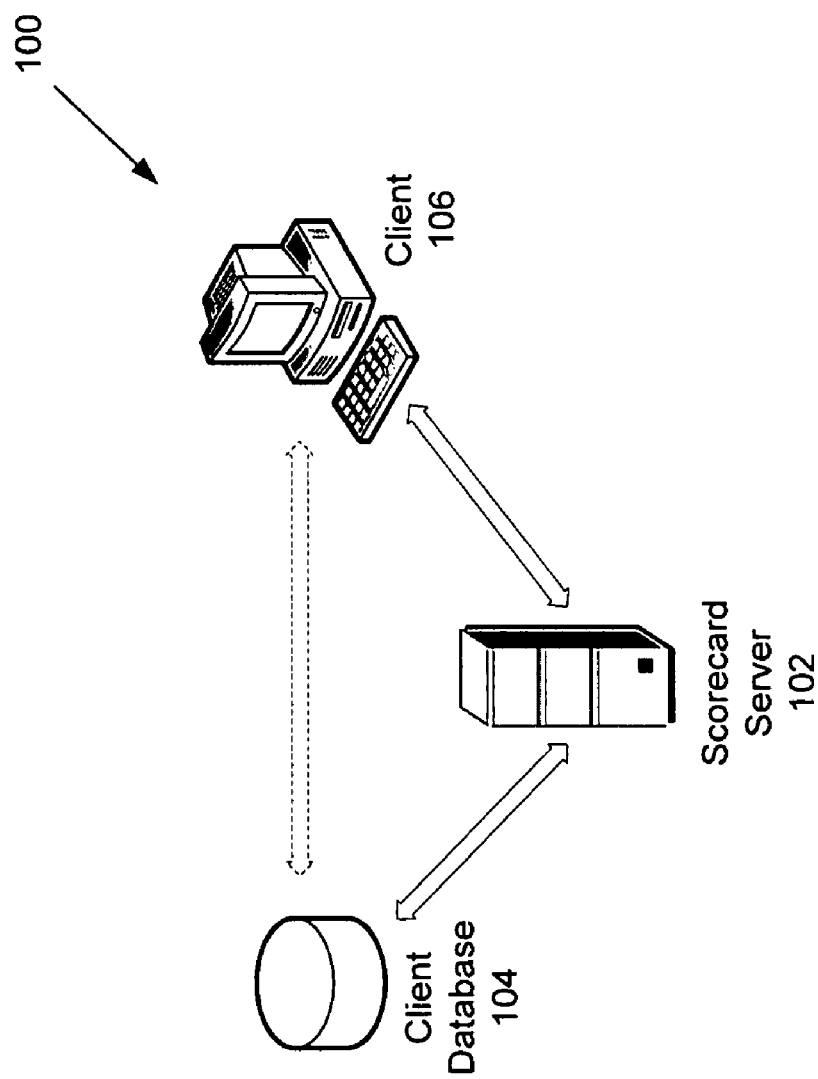
FIG. 1 shows an example system including a client, a scorecard server, and a data source.

FIG. 1 shows a basic system 100 for scorecard implementation. The system 100 includes a scorecard server 102, a client database 104, and a client 106. While the three elements of system 100 are shown communicating directly with each other, the scorecard server 102 can interact with the database 104 and the client 106 over a network (not shown) for performing scorecard calculations and rendering reports.

The network can be a secure network such as an enterprise network, or an unsecured network such as a wireless open network. Such a network is intended to provide communication between the nodes described above. By way of example, the network can include wired media such as a wired network or direct-wired connection, and wireless media such as acoustic, RF, infrared and other wireless media.

The system 100 can also include any topology of servers, clients, Internet service providers, and communication media. Also, the system 100 can have a static or dynamic topology. A business logic application can be run centrally on the server 102 or in a distributed manner over several servers and/or client devices. The server 102 can include a number of information systems, such as performance measures, business scorecards, and exception reporting. A number of organization-specific applications including, but not limited to, financial reporting, analysis, booking, marketing analysis, customer service, and manufacturing planning applications can also be configured, deployed, and shared in the system 100.

In example embodiments, performance measures, business scorecards, and exception reporting are published to the server 102 and are accessible to the client 106. In one embodiment, the server 102 is a MICROSOFT® Office PERFORMANCEPOINT™ Server 2007 developed by Microsoft Corporation of Redmond, Wash. Other configurations are possible.

The client database 104 is an example of a number of data sources that can provide input to the server 102. Additional data sources can include SQL servers, databases, non multi-dimensional data sources such as text files or EXCEL sheets, multi-dimensional data source such as data cubes, and the like.

In example embodiments, the server 102 and the client 106 are computer systems. For example, the client 106 can be a personal computing device, such as a desktop or laptop computer, a personal data assistant, or a cellular telephone. The client 106 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is a client operating system ("OS") and client applications. The client OS is a program that manages the hardware and software resources of the client system. The client applications utilize the resources of the client 106 to directly perform tasks specified by the user. The network device enables the client 106 to send and receive data to/from the server 102. Other configurations for the client 106 are possible.

In a typical application, users can interact with the server 102 running the business logic application from the client 106 and provide information as to what kind of scorecard calculation, on which data, and what type of reporting are desired. Based on the provided information, the server 102 can determine a hierarchy of a scorecard and retrieve data associated with the scorecard metrics from the client database 104. The server 102 can then perform the scorecard calculation and provide either a prepared report (e.g., scorecard representation) or scorecard data to be used in a client prepared report to the client 106.

The scorecards and other metrics that reside on the server 102 and that are presented to the client 106 can be created using the systems and methods described below. For example, in one embodiment, a scorecard can be created using a wizard that guides the user through the process of selecting a template for the layout of the scorecard, a data source, and one or more items such as KPIs. In another embodiment, the scorecard can be created using a blank template and a What You See Is What You Get ("WYSIWYG") interface editor that allows the user to define the layout, data source, and one or more items such as KPIs. In yet another embodiment, a combination of the wizard and the WYSIWYG interface editor can be used to create the scorecard.

An example process for using a wizard to create a scorecard is shown in FIGS. 2-16.

Figure 2:
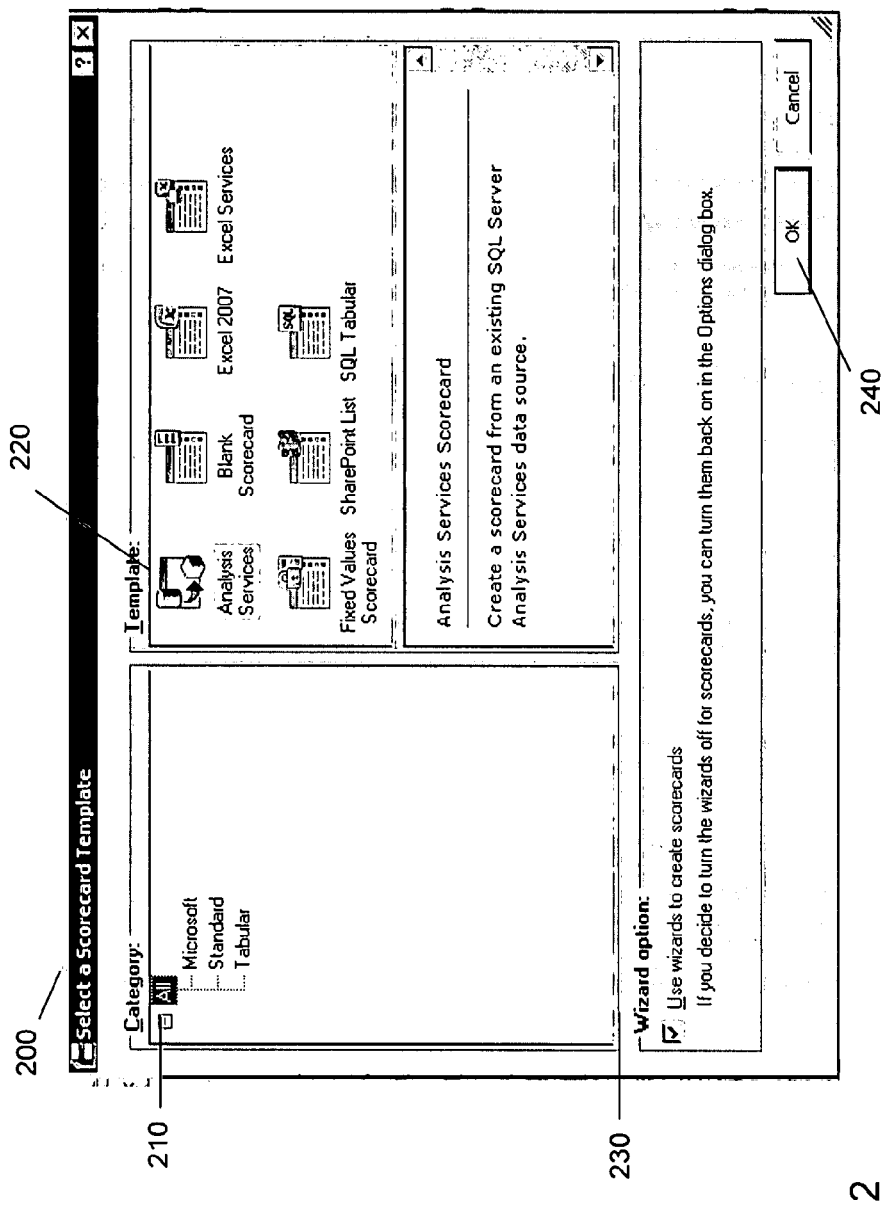
FIG. 2 shows an example interface for selecting a template for a scorecard.

Referring now to FIG. 2, an example scorecard template interface 200 for selecting a template is shown. The interface 200 contains a categories module 210 that allows the user to select among various subsets of templates, such as all templates, Microsoft templates, standard templates, and tabular templates. The interface 200 also includes a template module 220 that lists the available templates based on the selected category in the categories module 210. The example available templates shown in the template module 220 include Analysis Services, Excel, Excel Services, fixed value scorecard, Microsoft SharePoint list, Microsoft SQL tabular template, and a blank template. The scorecard template interface 200 also contains a Wizard option checkbox 230 that, when selected, allows a wizard to guide the user through scorecard creation. Otherwise, if the user unchecks the check box 230, the user can, for example, create a scorecard using the WYSIWYG interface editor, as described below.

Figure 3:
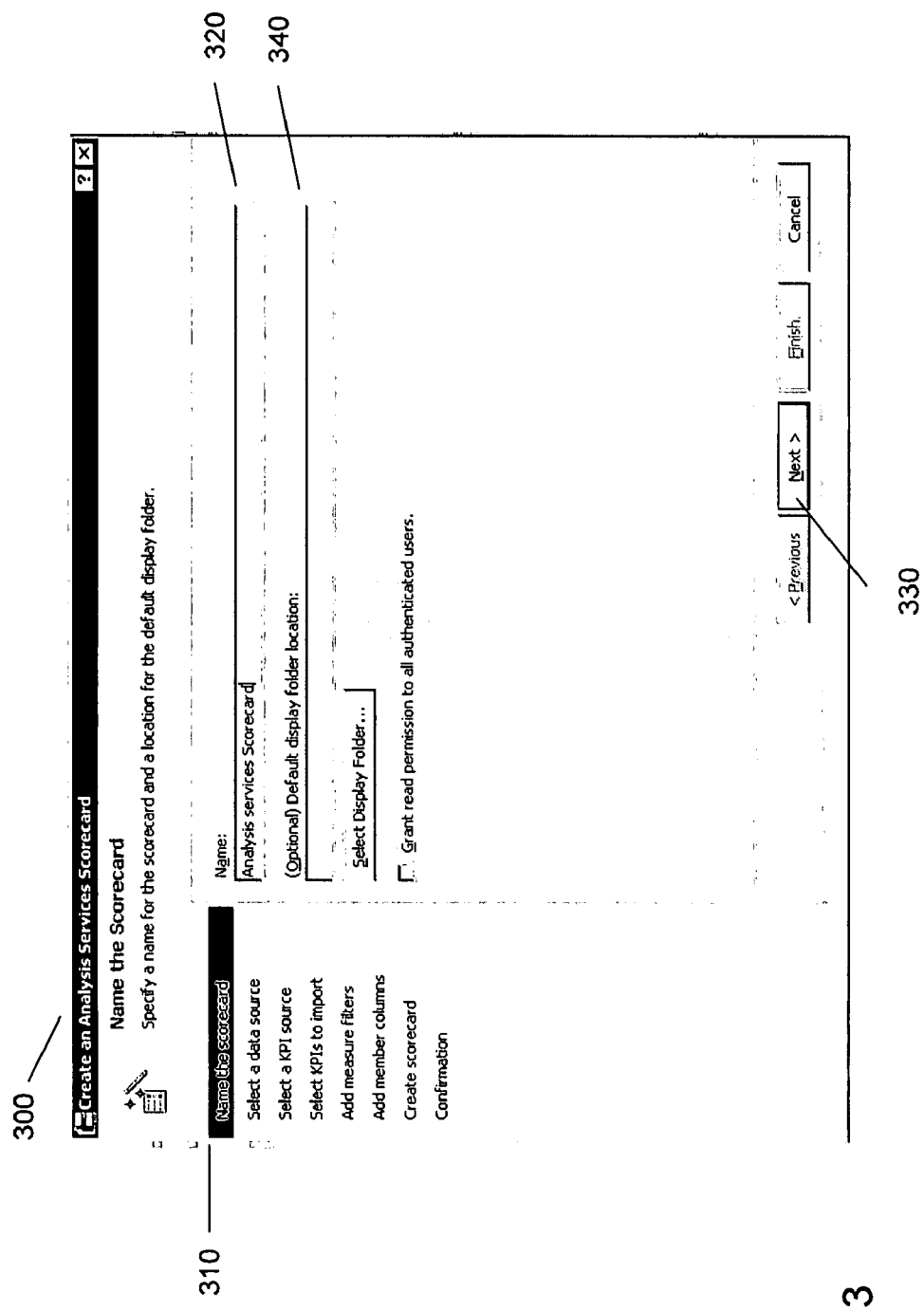
FIG. 3 shows an example interface for naming a scorecard.

Referring now to FIG. 3, once the user selects a template in the scorecard template interface 200, the user is presented with an example name interface 300. A text box 320 of the name interface 300 allows the user to enter a name for the scorecard. The name interface 300 also includes a text box 340 that allows the user to define a folder in which to store the scorecard. Once the user selects the desired name and folder, the user clicks a next button 330 to continue creation of the scorecard using the wizard.

The name interface 300 also includes a menu 310 that orients the user with respect to at which step in the wizard the user is currently working. For example, in FIG. 3, the "Name the scorecard" entry in the menu 310 is highlighted. As the user is guided through the wizard, each step listed in the menu 310 is highlighted to provide a clear indication to the user of the user's progress through the wizard.

Figure 4:
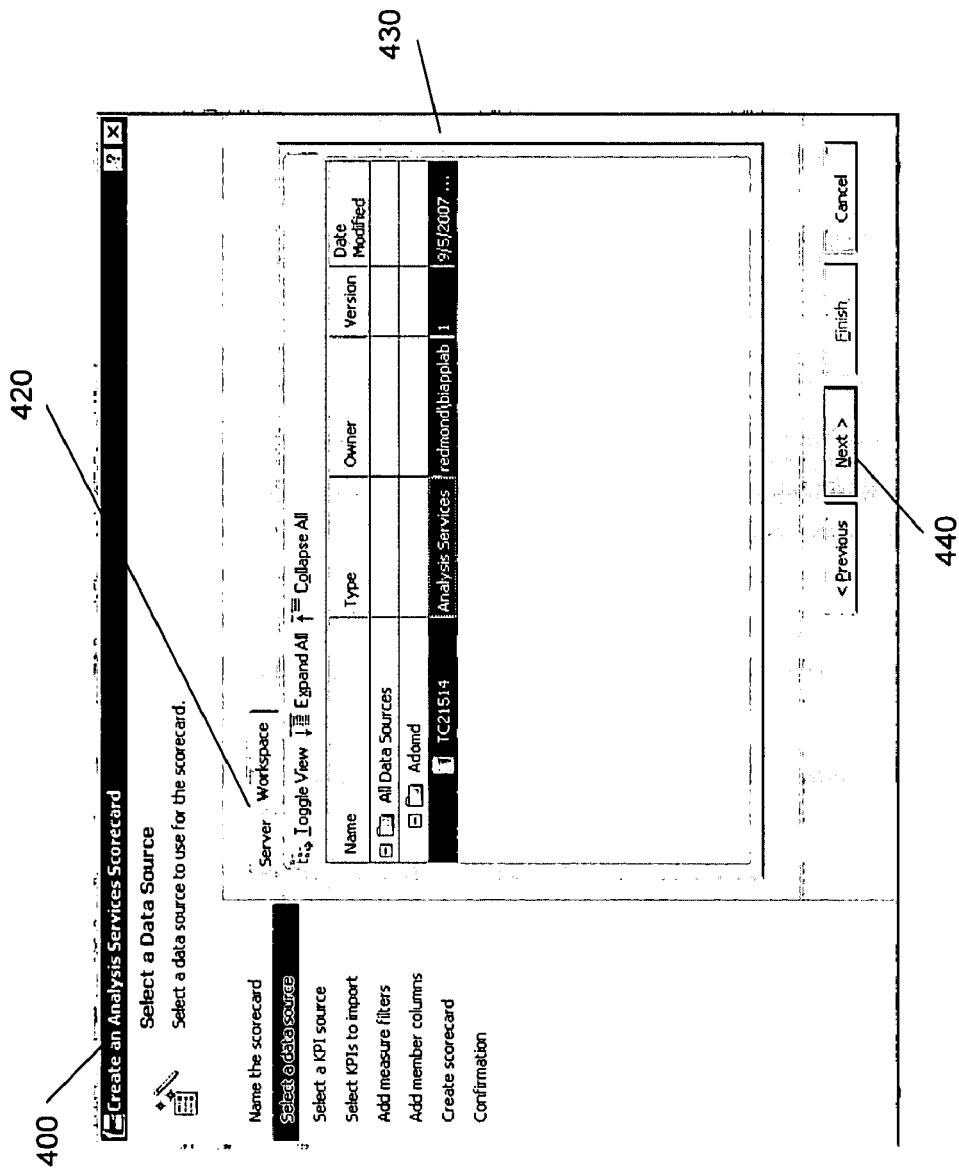
FIG. 4 shows an example interface for selecting a data source for a scorecard.

Referring now to FIG. 4, the user is then presented with a data source selection interface 400. The data source selection interface 400 allows the user to select one or more data sources for the scorecard. In example embodiments, a data source area 420 allows the user to select the data source from the server or a local workspace. In some embodiments, only data sources that are compatible with the template selected in the scorecard template interface 200 are shown. In the example shown, the user highlights a data source 430. When the selection is made, a next button 440 is clicked to continue.

Figure 5:
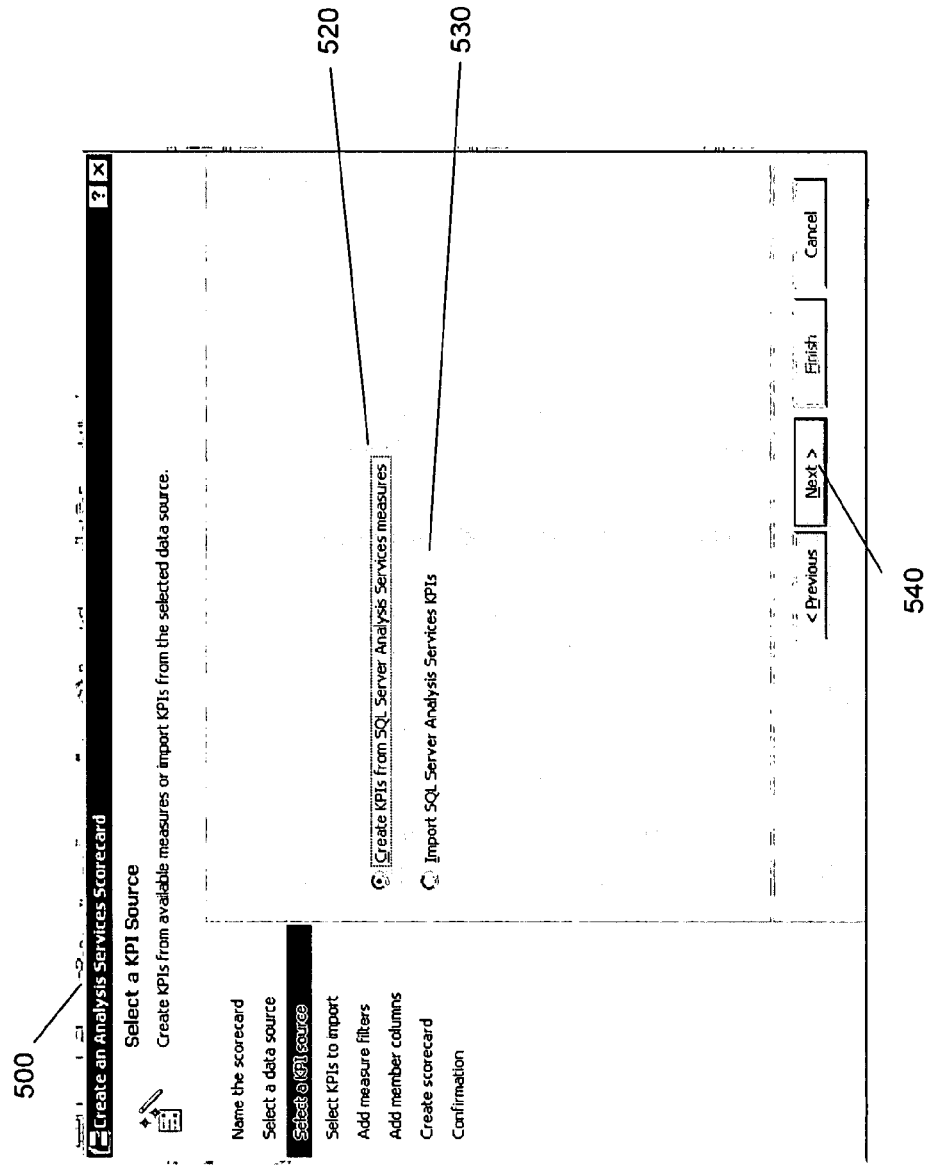
FIG. 5 shows an example interface for selecting a KPI source for a scorecard.

Referring now to FIG. 5, a KPI source interface 500 is shown. KPIs are metrics used to quantify performance objectives. Some examples of key performance indicators are sales totals, order totals and product cost. Various metrics can be associated with a KPI, such as an actual value, a target value and a band. The actual value represents the current value of the item—for example, current sales for a product. The target value represents the value that the organization expects the item to have at a future time—for example, in a month or in the next quarter. The band indicates how the target is to be judged with respect to the actual—for example, whether increasing is better, decreasing is better, or staying close to the target is better.

The KPI source interface 500 allows the user to select a KPI source. In the example shown, two KPI sources are provided, including KPIs from a SQL Server Analysis Services measures associated with a checkbox 520, and importation from an SQL Server Analysis Services KPIs associated with a checkbox 530. In this example, checkbox 520 is selected for creating KPIs from SQL Server Analysis Services measures. The next button 540 is then clicked to move to the next interface in the wizard.

Figure 6:
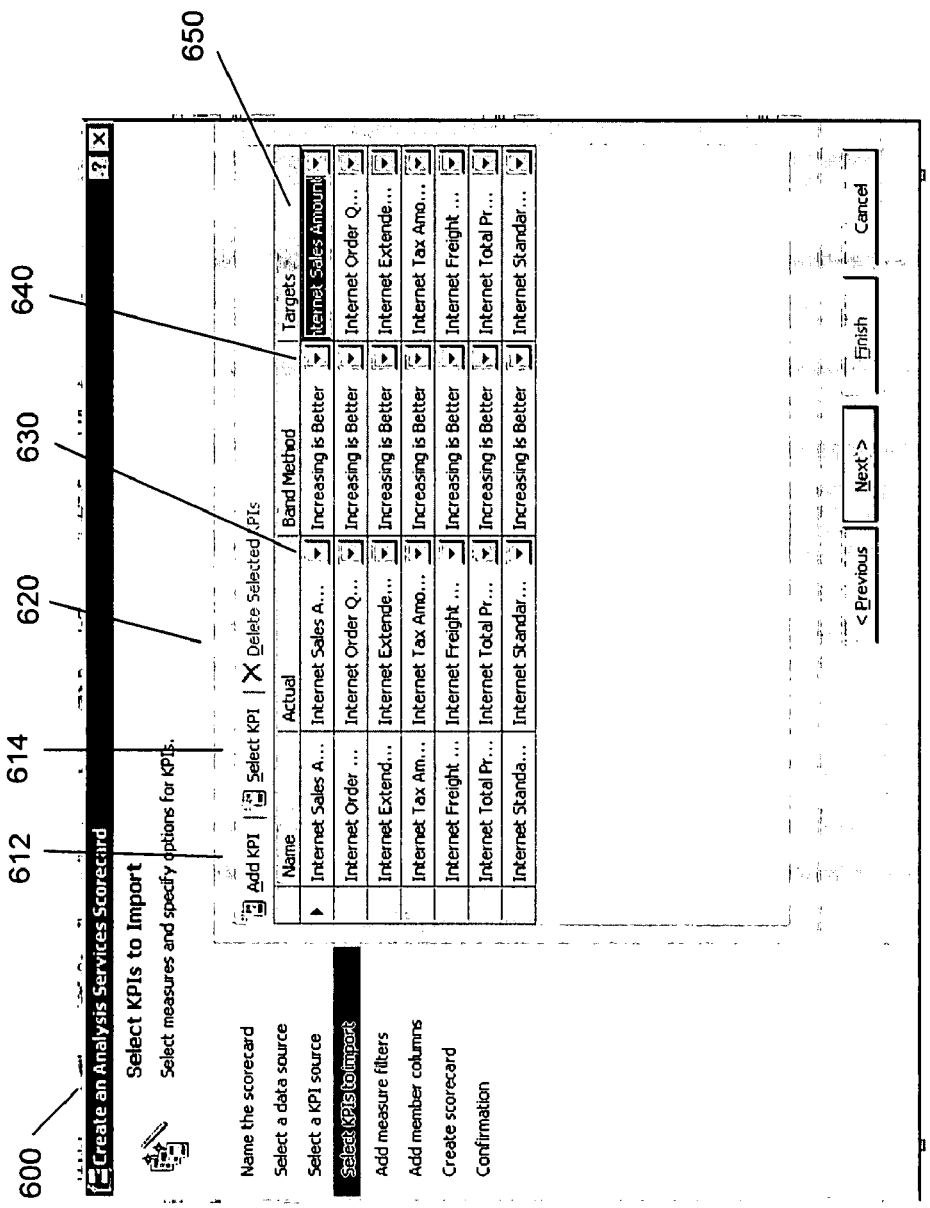
FIG. 6 shows an example interface for selecting KPIs for a scorecard.

Referring now to FIG. 6, an example KPI selection interface 600 is shown. A workspace area 620 of the KPI selection interface 600 contains an add KPI button 612, a select KPI button 614, and a delete KPI button 620. When the add KPI button 612 is clicked, the user can select one or more KPIs to add to the KPI selection interface 600. The name of each KPI is shown along with columns for Actual, Band Method and Target. The columns for Actual, Band Method and Target are displayed as pull-down list boxes. When the list button is pressed for a KPI metric, a selection of choices is presented to the user. For example, when a list button 630 for the Actual metric for the first KPI is depressed, the user can select available parameters for the Actual value. In this example, "Internet Sales Amount" is selected. As another example, when a list button 640 is pressed for the Band Method for the first KPI, the user is presented with the choices of "Increasing is Better," "Decreasing is Better," and "Closer to the Target is Better." In this example, the user selects "Increasing is Better," indicating that the target for the "Internet Sales Amount" is expected to increase. The Target can either be selected from the pull down list box or by entering an actual value for the target. For example, an Actual Value for the target can be entered for the first KPI in text box 650. The user can select a KPI and then select the delete KPI button 620 to remove the particular KPI.

Figure 7:
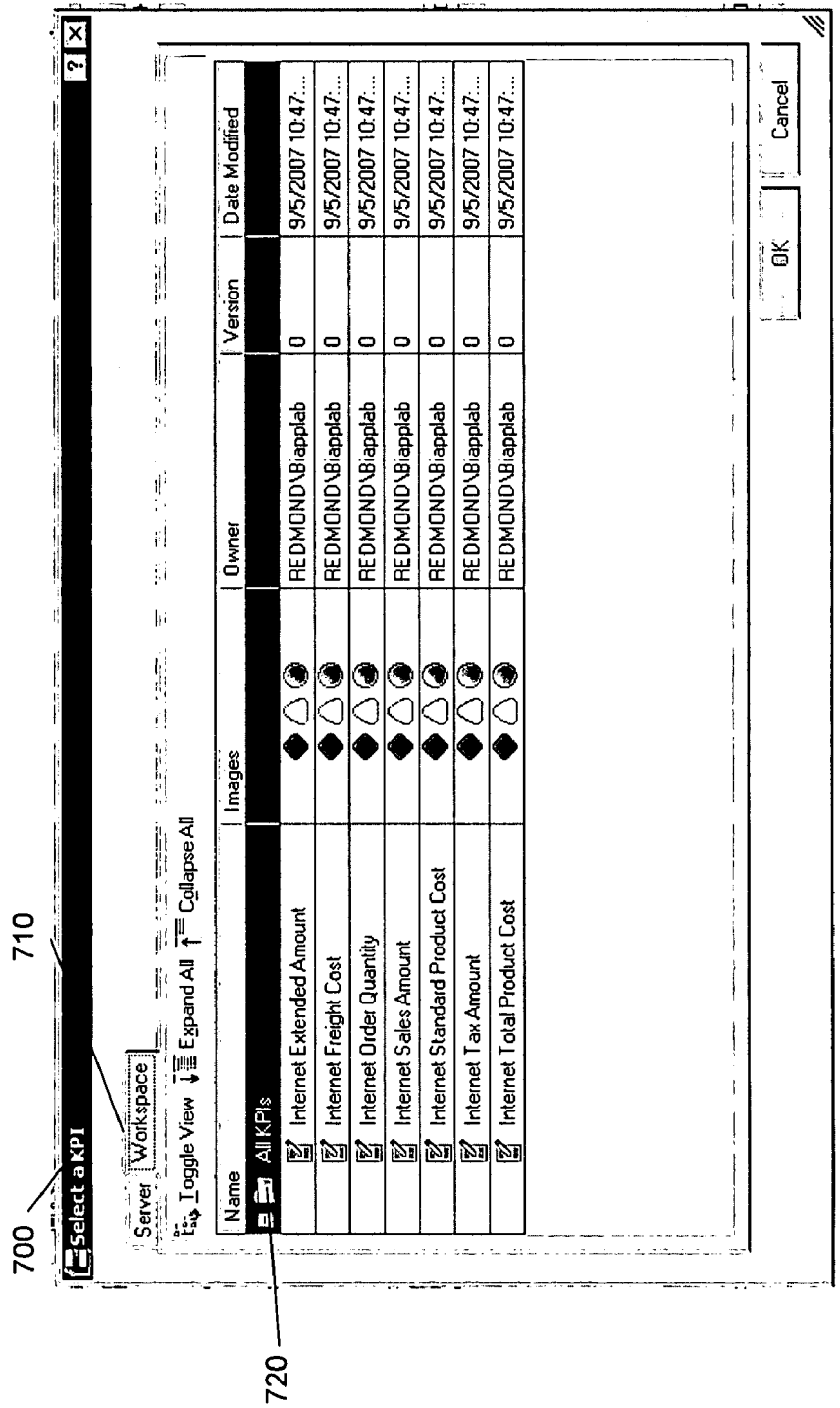
FIG. 7 shows an example interface showing selected KPIs for a scorecard.

Referring now to FIG. 7, the user can select the select KPI button 614 on KPI selection interface 600 to access selection interface 700 to add KPIs to an existing scorecard. To select KPIs for an existing scorecard, one or more KPIs are highlighted in a KPI section area 720. The KPI section area 720 lists the KPI name, images associated with the KPI, the owner, the version, and the date modified for each available KPI. A tab 710 allows the user to select KPIs from both local workspaces and the server.

Figure 8:
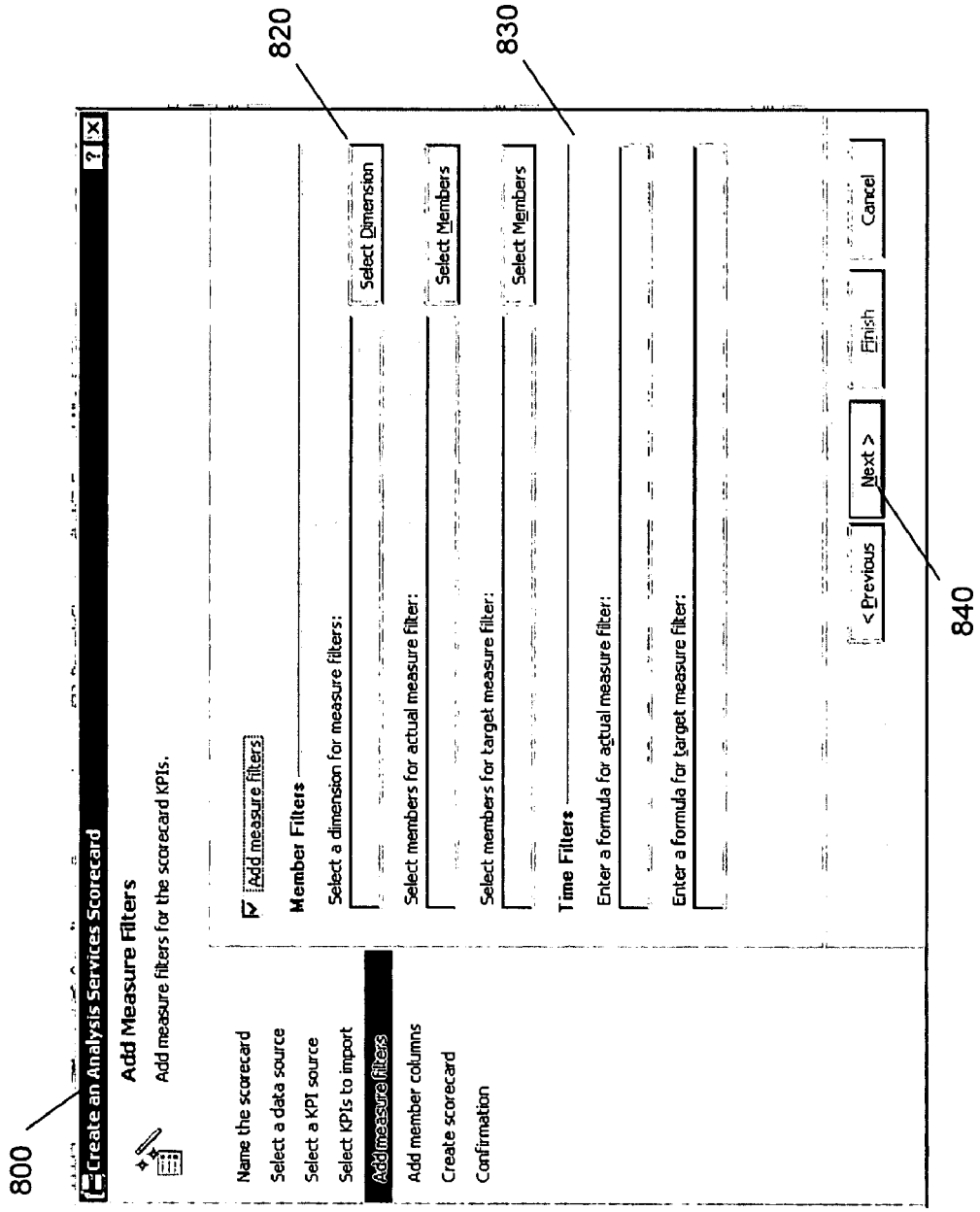
FIG. 8 shows an example interface for adding measure filters to a scorecard.

Referring now to FIG. 8, one or more measure filters can be added through selection using a filter interface 800. A measure filter is a control that can modify the content of a KPI. For example, time filters can be created to modify sales totals based on a time quantity, for example a month, a quarter, a year, or a range of months. As another example, filters can be used to modify the content of a KPI based on geography. So, for example, sales totals can be shown for a country, a region, or any similar geographic area.

The filter interface 800 is shown with an add measure checkbox 810 selected to allow for the addition of one or more filters. A member filter area 820 allows the user to select dimensions for the filters, select members for actual filters, and to select for target filters, as described further below. The filter interface 800 also includes a time filter area 830 that allows the user to select time filters to apply to the KPIs.

Figure 9:
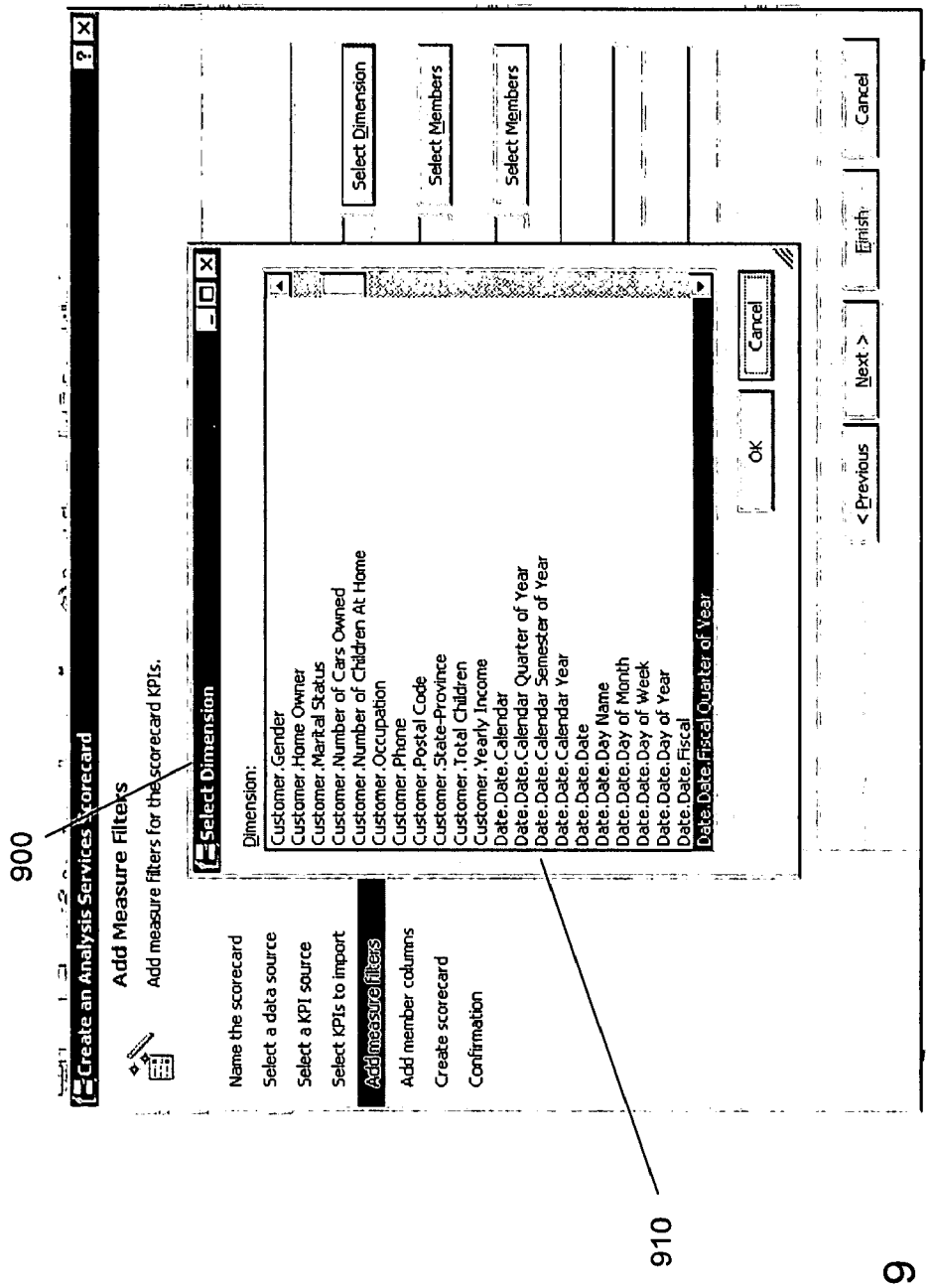
FIG. 9 shows an example interface for selecting dimensions for a scorecard.

Referring now to FIG. 9, if the user selects the dimensions box in the member filter area 820, a select dimension interface 900 is shown. The user selects a dimension from a list 910 in the dimension interface 900. For example, a dimension "Date.Date.Fiscal Quarter of Year" is shown as having been selected.

Figure 10:
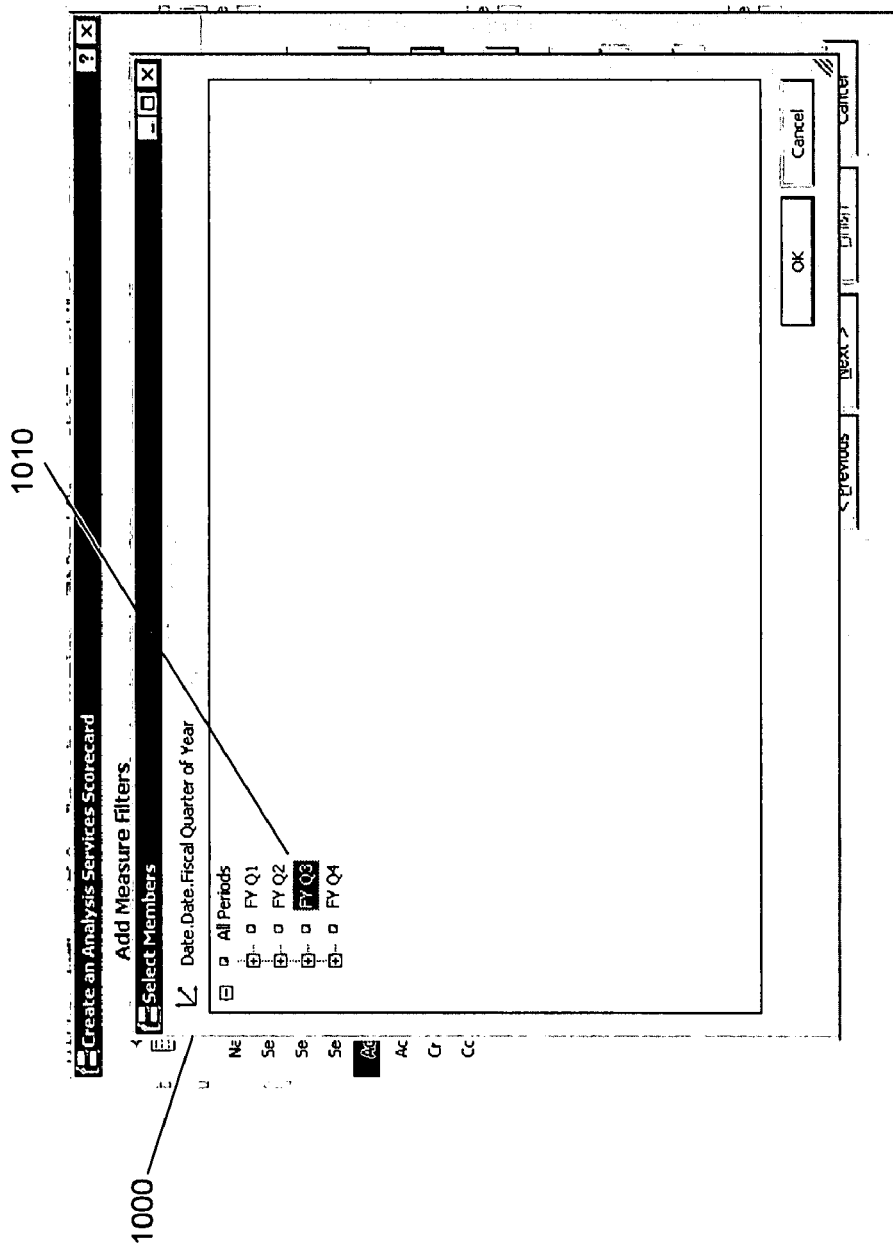
FIG. 10 shows an example interface for selecting members for a scorecard.

Referring now to FIG. 10, the user can likewise select the members box in the member filter area 820 to access a select members interface 1010. The user selects a member from a list 1010. For example, a member "FY Q3" is shown as having been selected.

Figure 11:
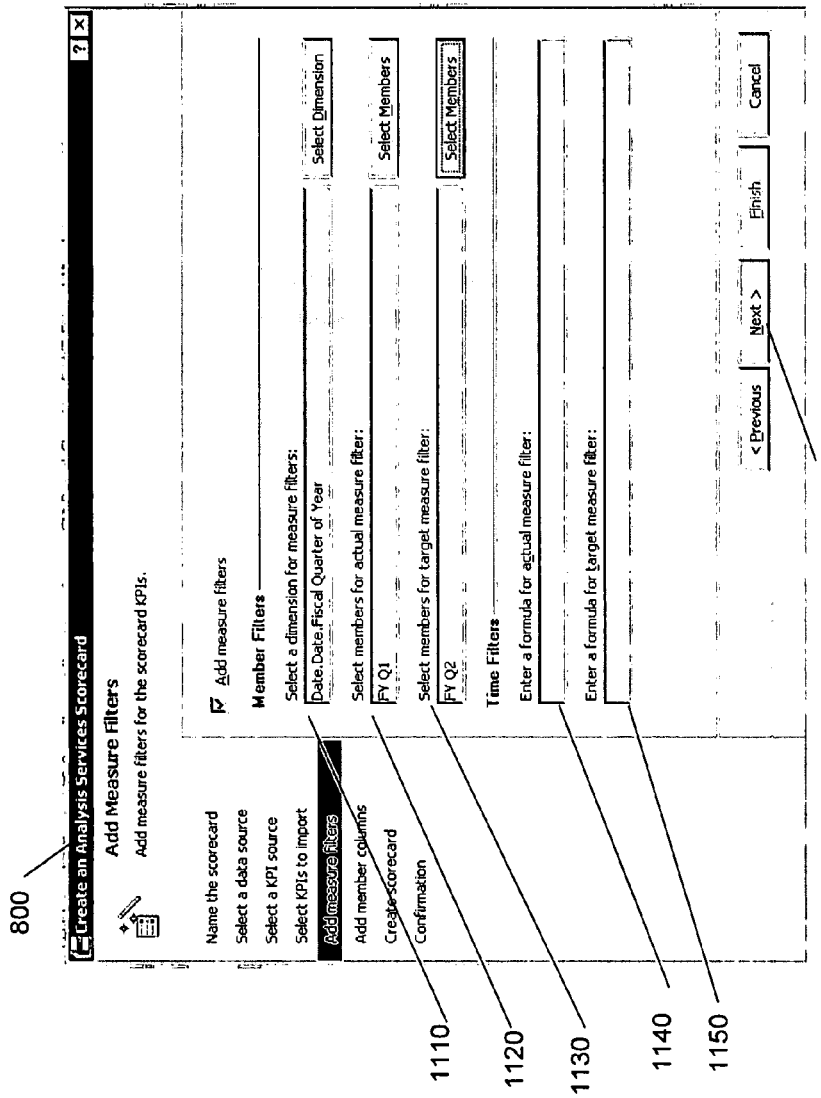
FIG. 11 shows an example interface for selecting filters for a scorecard.

Referring now to FIG. 11, the filter interface 800 is shown after the dimension and members have been selected. In this example, the dimension selected 1110 is the fiscal quarter of the year, the member selected for the actual measure filter 1120 is fiscal quarter Q1 and the member selected for the target measure filter 1130 is fiscal quarter Q2. The user can optionally add a formula 1140 for an actual member time filter and a formula 1150 for a target member time filter. The user then clicks the next button 1160 to continue through the wizard.

Figure 12:
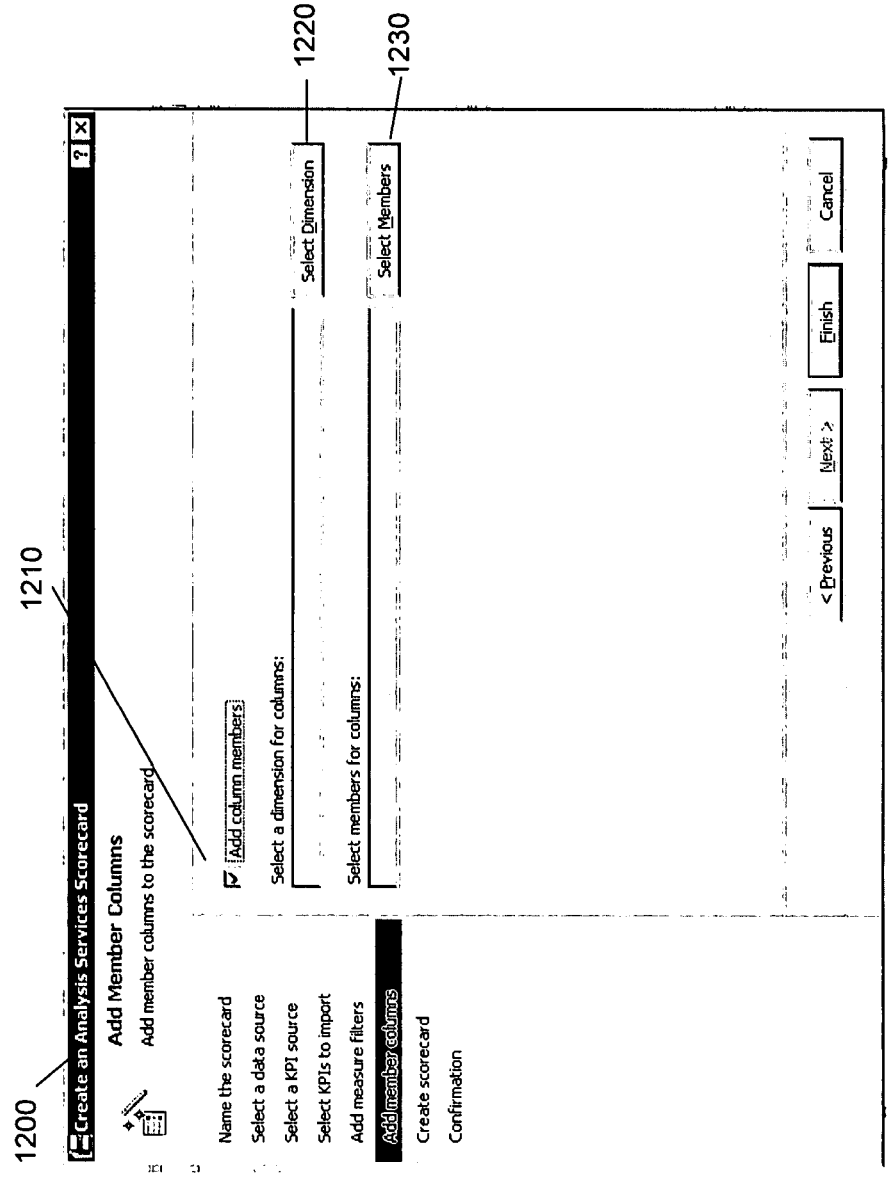
FIG. 12 shows an example interface for selecting columns for a scorecard.

FIG. 12 shows a column interface 1200 that can be used to add columns to the scorecard. If the user wishes to add columns, a checkbox 1210 is selected. Dimensions and members can be added for each column by selecting a select dimension button 1220 and a select members button 1230, as described below.

Figure 13:
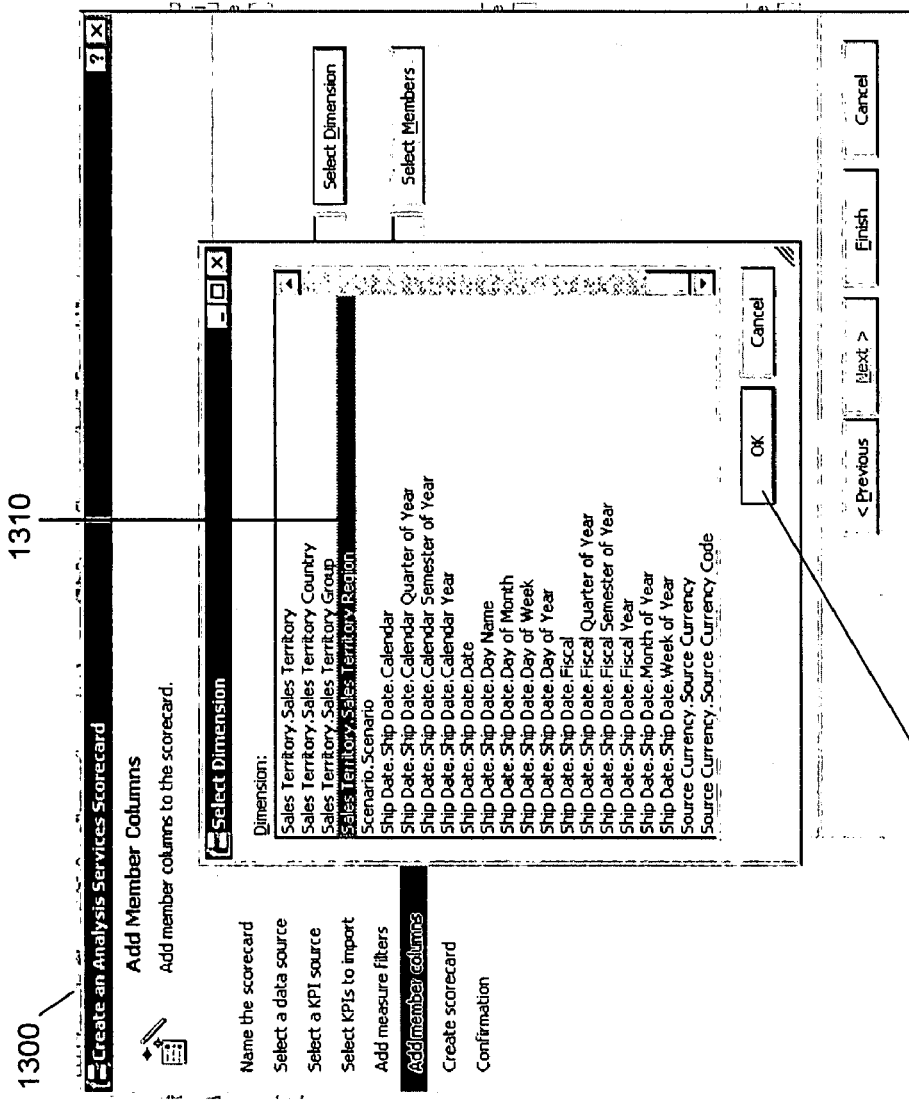
FIG. 13 shows an example interface for selecting dimensions for columns of a scorecard.

Referring now to FIG. 13, when the select dimension 1220 button is clicked, a selection dimensions interface 1310 is shown. The user selects a dimension such as, for example, "Sales Territory.Sales Territory Region," within a selection area 1310 and clicks an OK button 1320 to add the dimension.

Figure 14:
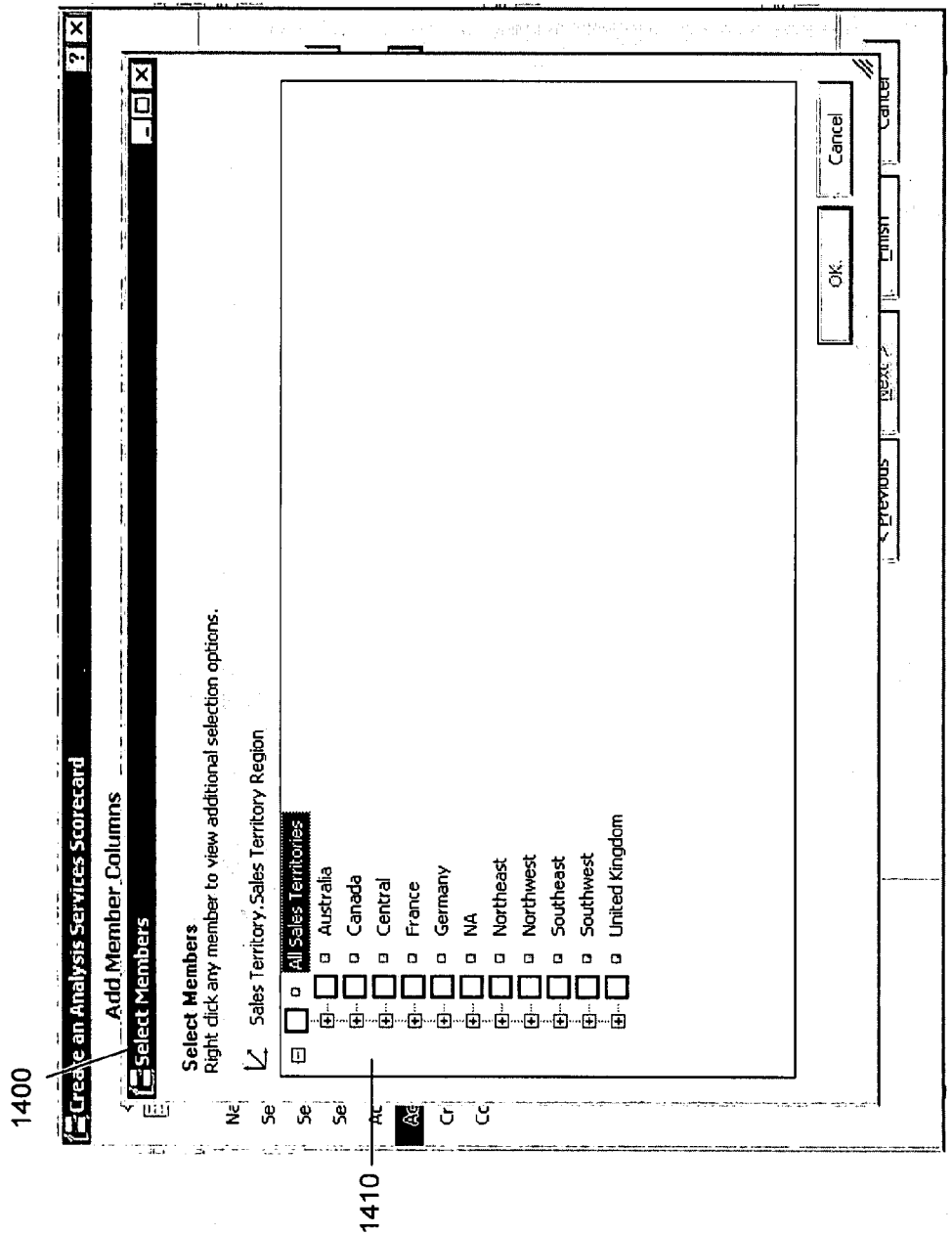
FIG. 14 shows an example interface for selecting members for columns of a scorecard.

Referring now to FIG. 14, when the members button 1230 is clicked, a select members interface 1400 is displayed. The user then selects members within a selection area 1410 (e.g., Australia, Canada, Central, France, Germany) and clicks an OK button to return to the column interface 1200.

Figure 15:
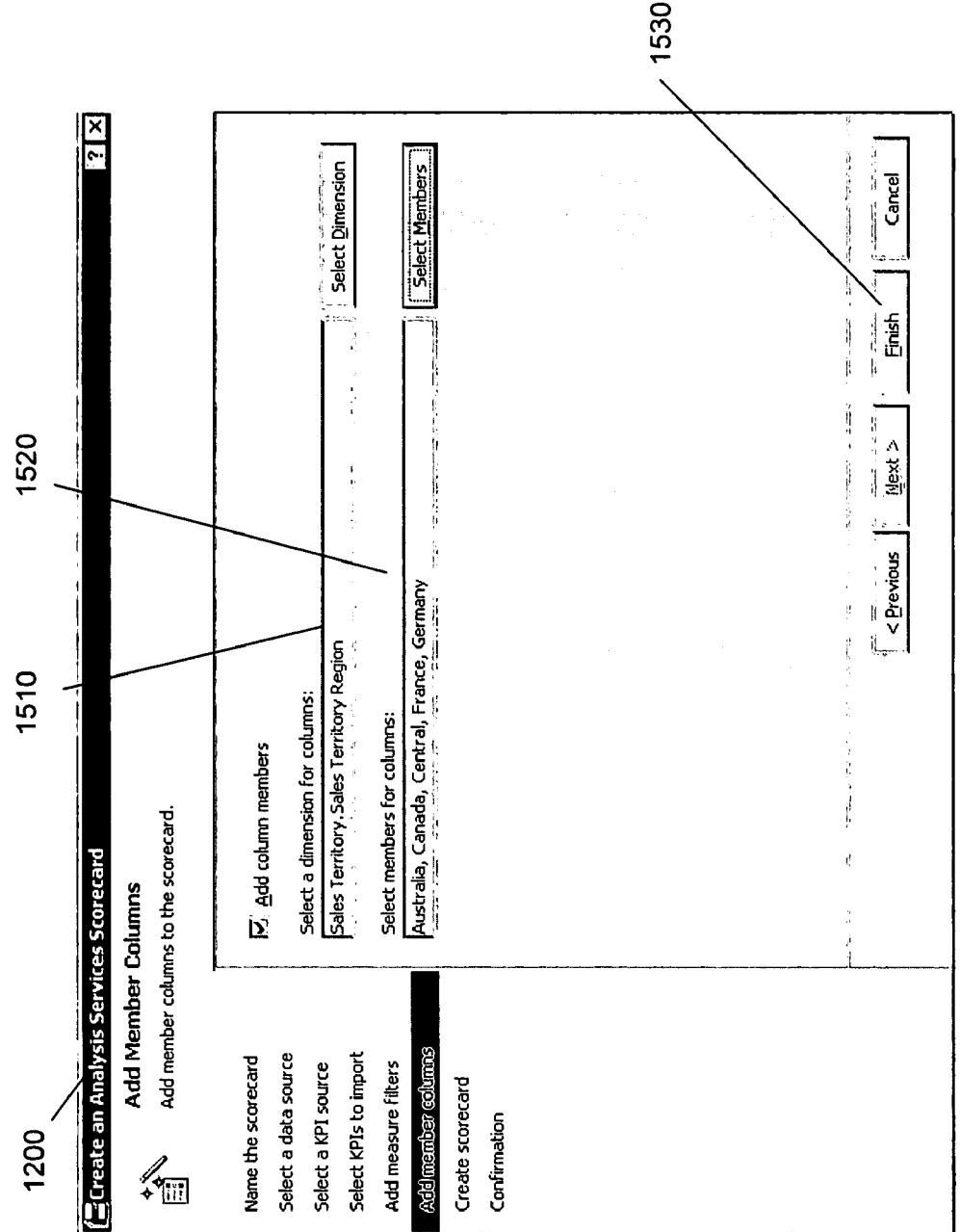
FIG. 15 shows an example interface for selecting columns for a scorecard.

FIG. 15 shows the column interface 1200 with the example dimension and members added. When the user clicks a finish 1530 button, creation of a scorecard using the wizard is complete.

Figure 16:
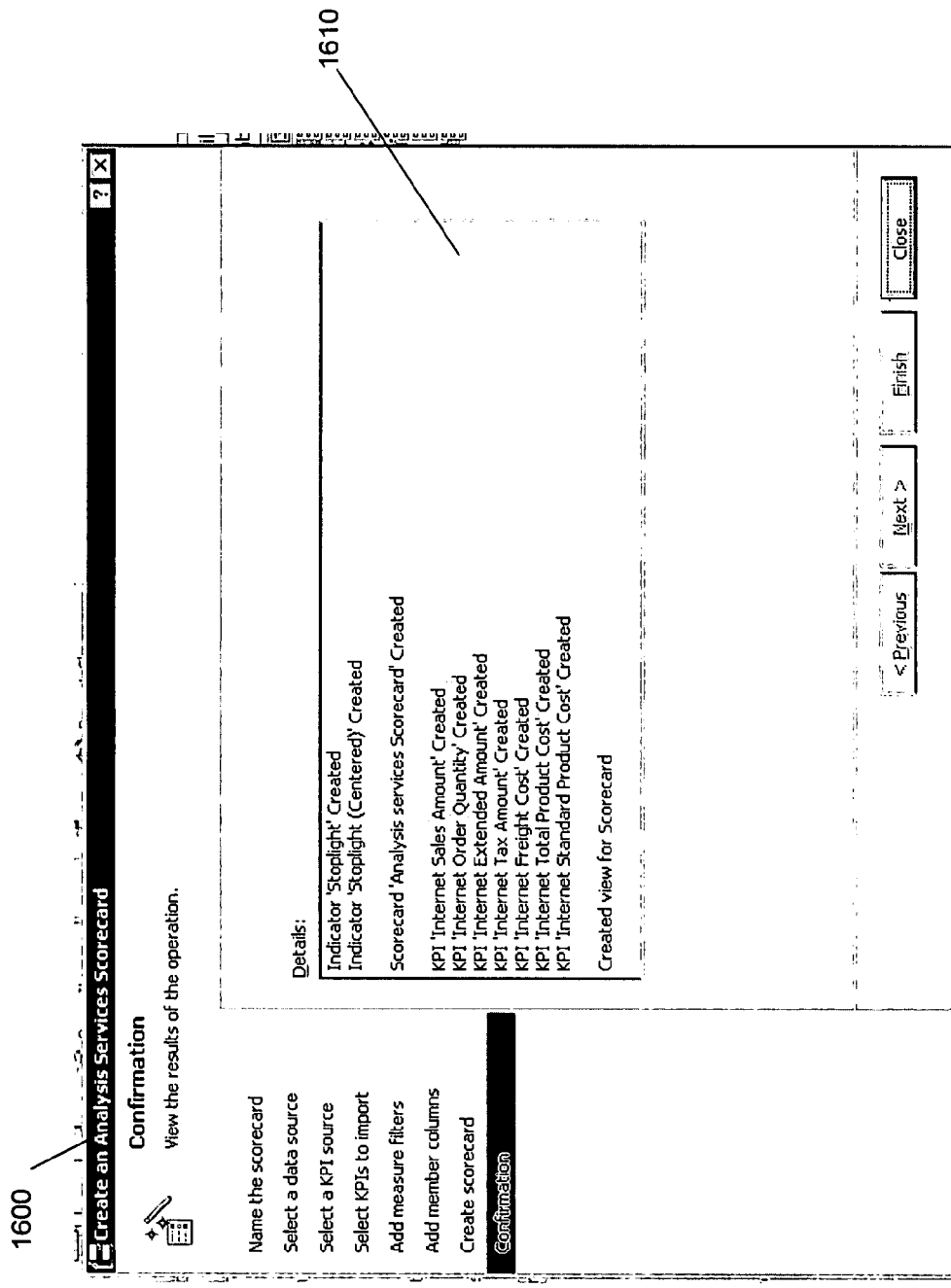
FIG. 16 shows an example interface confirming results for a scorecard.

Referring now to FIG. 16, an example completion interface 1600 is shown. The completion interface 1600 includes a confirmation area 1610 that provides a list of the objects that have been created in conjunction with the creation of the scorecard.

Figure 17:
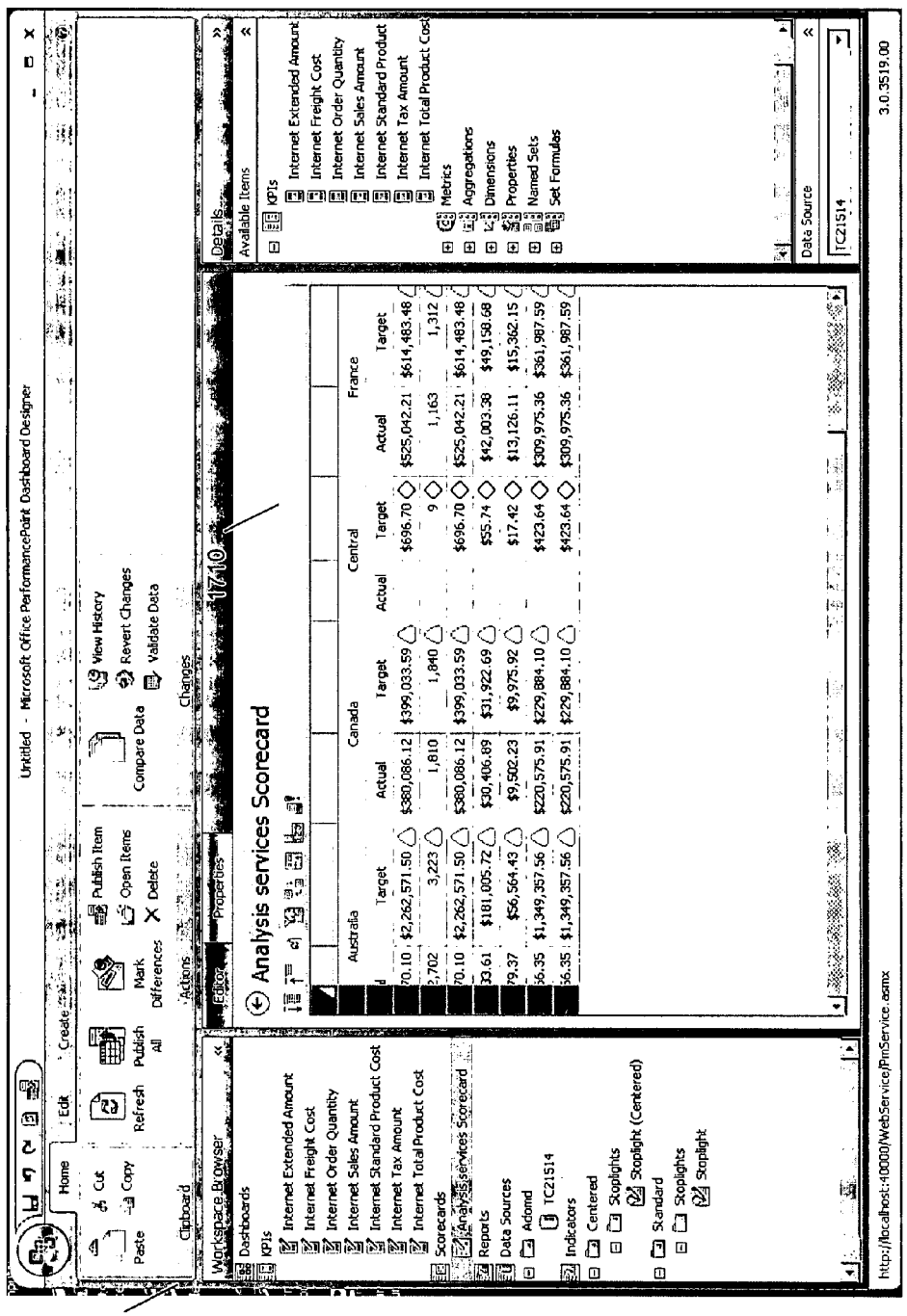
FIG. 17 shows an example scorecard editor interface.

Referring now to FIG. 17, an example of a scorecard editor interface 1700 is shown. The scorecard editor interface 1700 includes a workspace 1710 including the scorecard created using the wizard described above. As described further below, the scorecard editor interface 1700 can be used to manipulate the scorecard after the scorecard has been created using the wizard.

Referring now to FIGS. 18-24, in alternative embodiments, a scorecard can be created by starting with a blank template.

Figure 18:
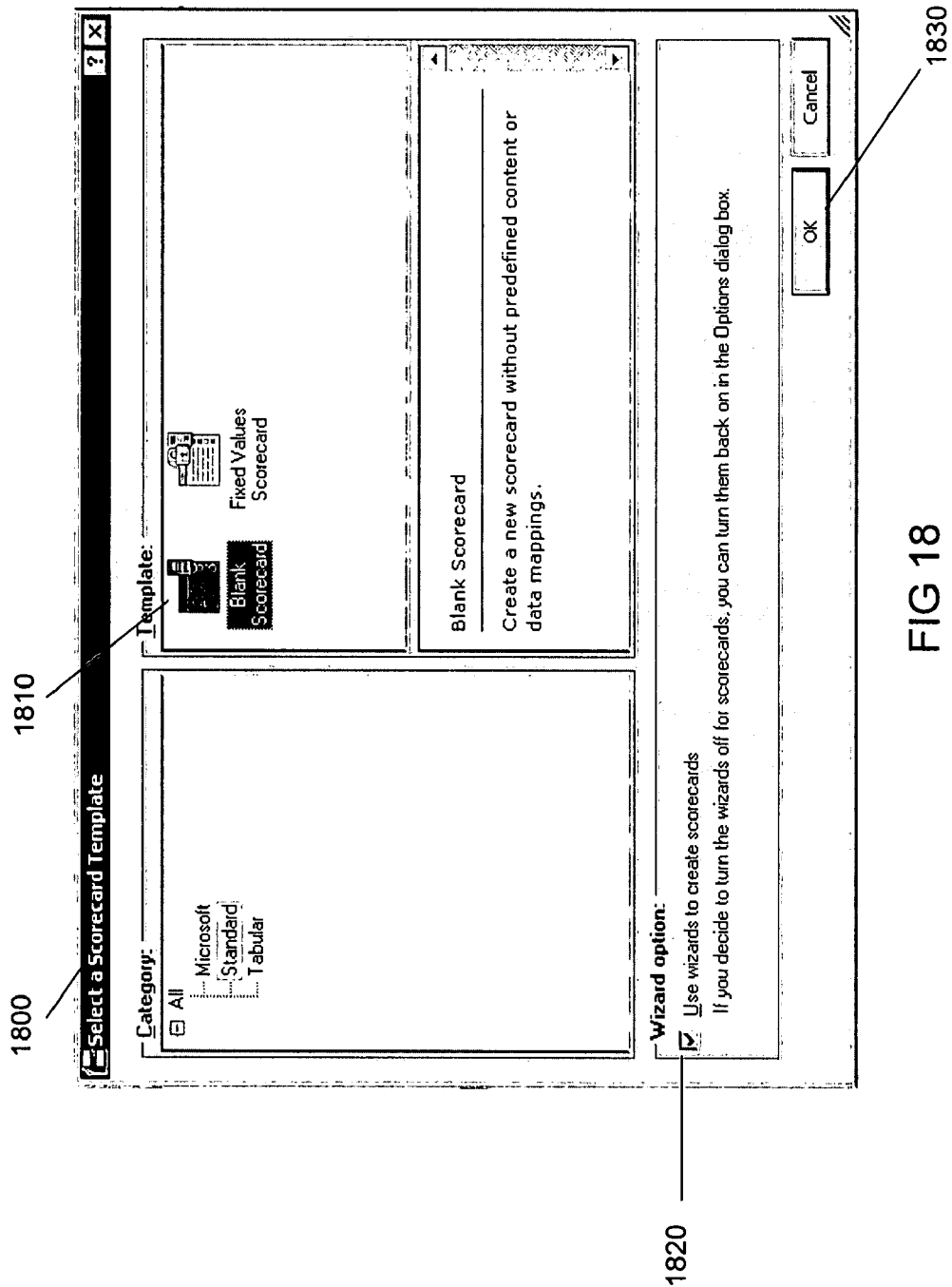
FIG. 18 shows an example interface for selecting a template for a scorecard.

Referring now to FIG. 18, an example template interface 1800 is shown with a blank scorecard 1810 highlighted. To create the scorecard directly, the user unchecks a wizard checkbox 1820 and clicks an OK button 1830.

Figure 19:
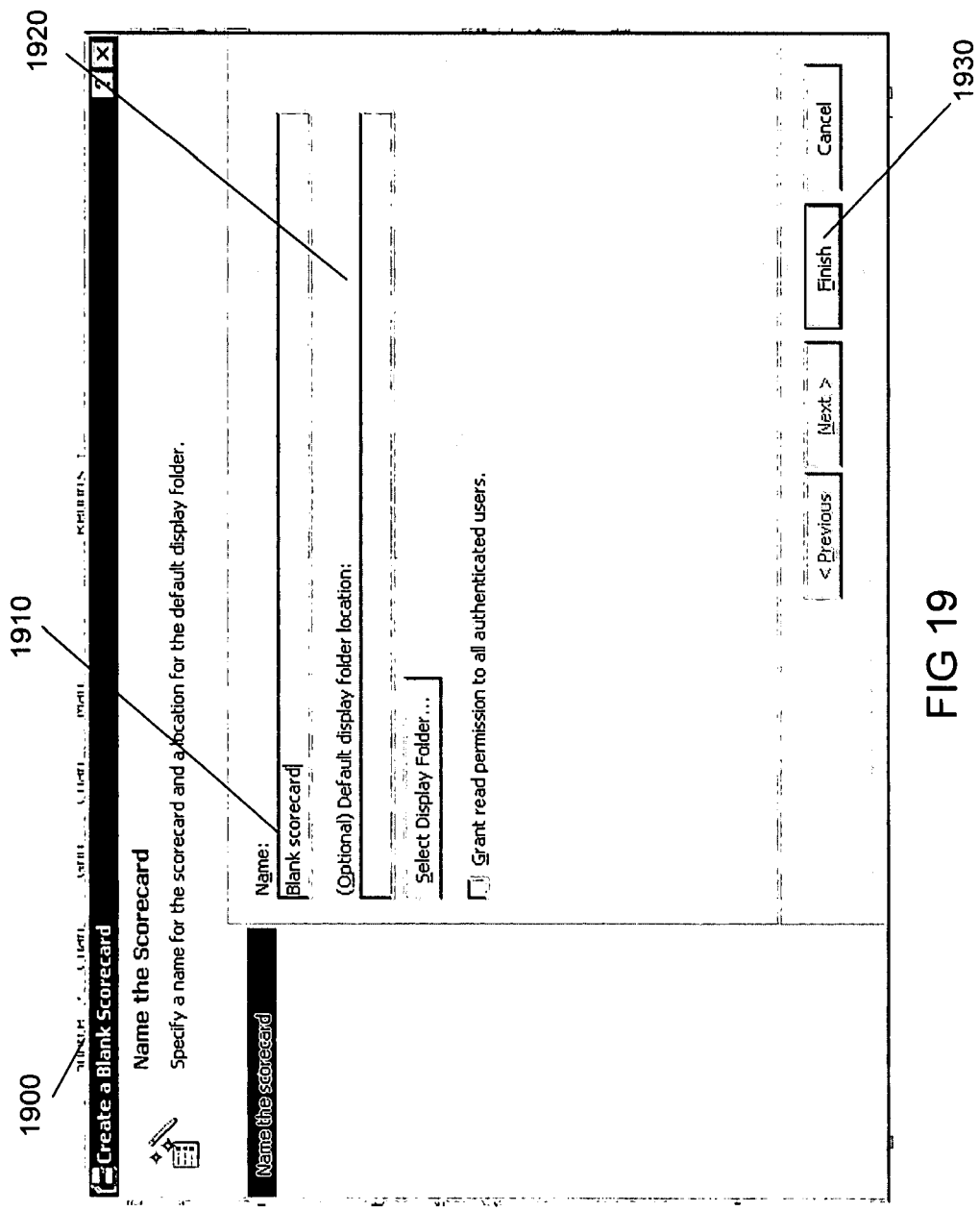
FIG. 19 shows an example interface for naming a scorecard.

Referring now to FIG. 19, an example name interface 1900 is shown. The name interface 1900 allows the user to enter a name for the scorecard in a textbox 1910, and to enter a folder location for storing the scorecard in a textbox 1920. The user then selects a finish button 1930.

Figure 20:
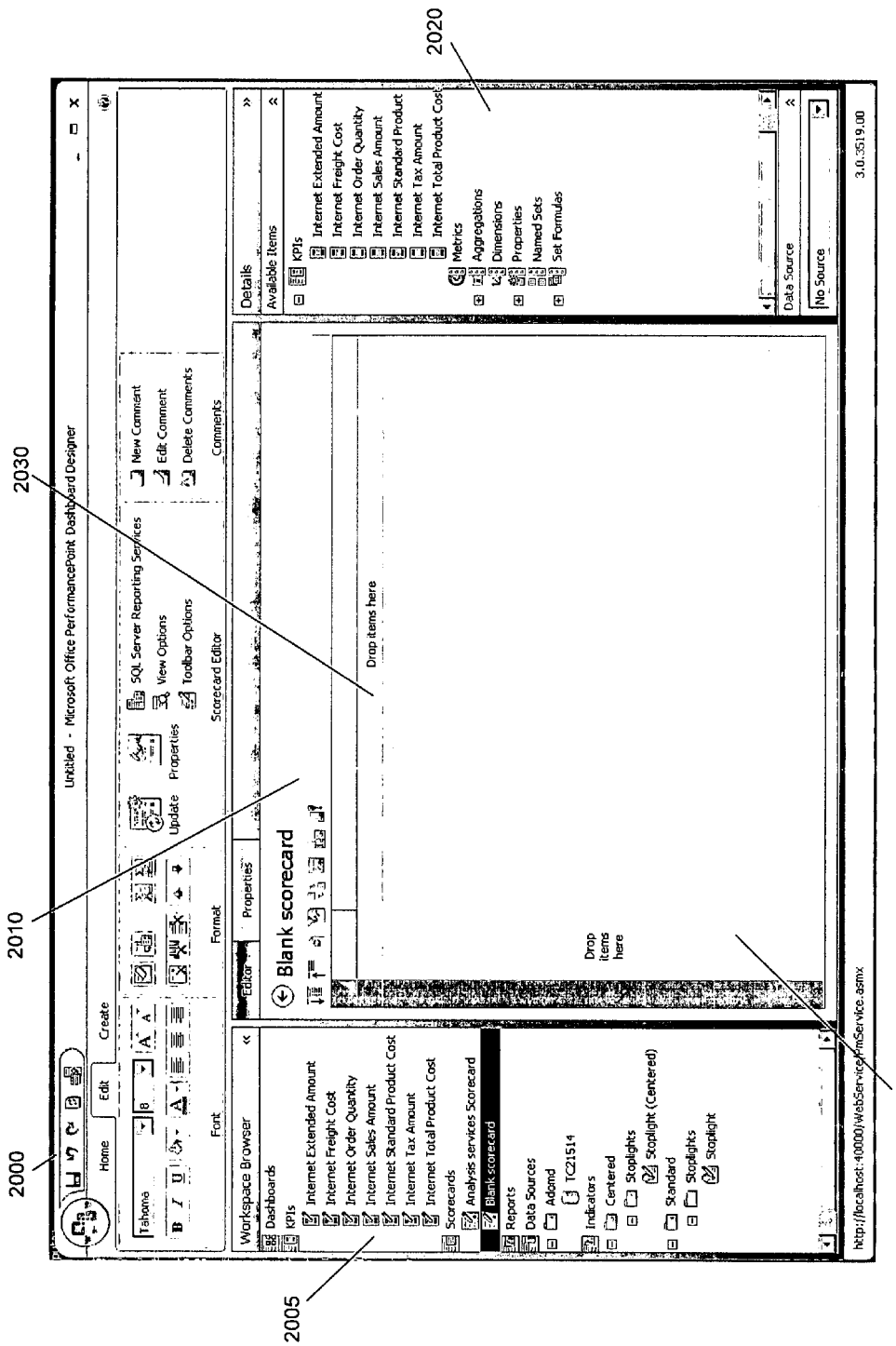
FIG. 20 shows another example scorecard editor interface.

Referring now to FIG. 20, an example scorecard editor interface 2000 is shown. The scorecard editor interface 2000 includes a workspace browser 2005 that provides information as to where particular items, such as scorecards and KPIs, are stored. The scorecard editor interface 2000 also includes a scorecard workspace 2010 and an items area 2020. The items area 2020 contains a plurality of items such as KPIs, metrics, aggregations, dimensions, properties, named sets, and set formulas. For example, the items area 2020 includes KPIs such as Internet Sales Amount, Internet Order Quantity, Internet Tax Amount and Internet Total Product Cost.

The scorecard workspace 2010 defines an area into which KPIs can be dragged and dropped. The drag and drop areas include a column area 2030 and a row area 2040. In example embodiments, items from the items area 2020 can be dragged and dropped into the scorecard workspace 2010 to create a scorecard, as described below.

Figure 21:
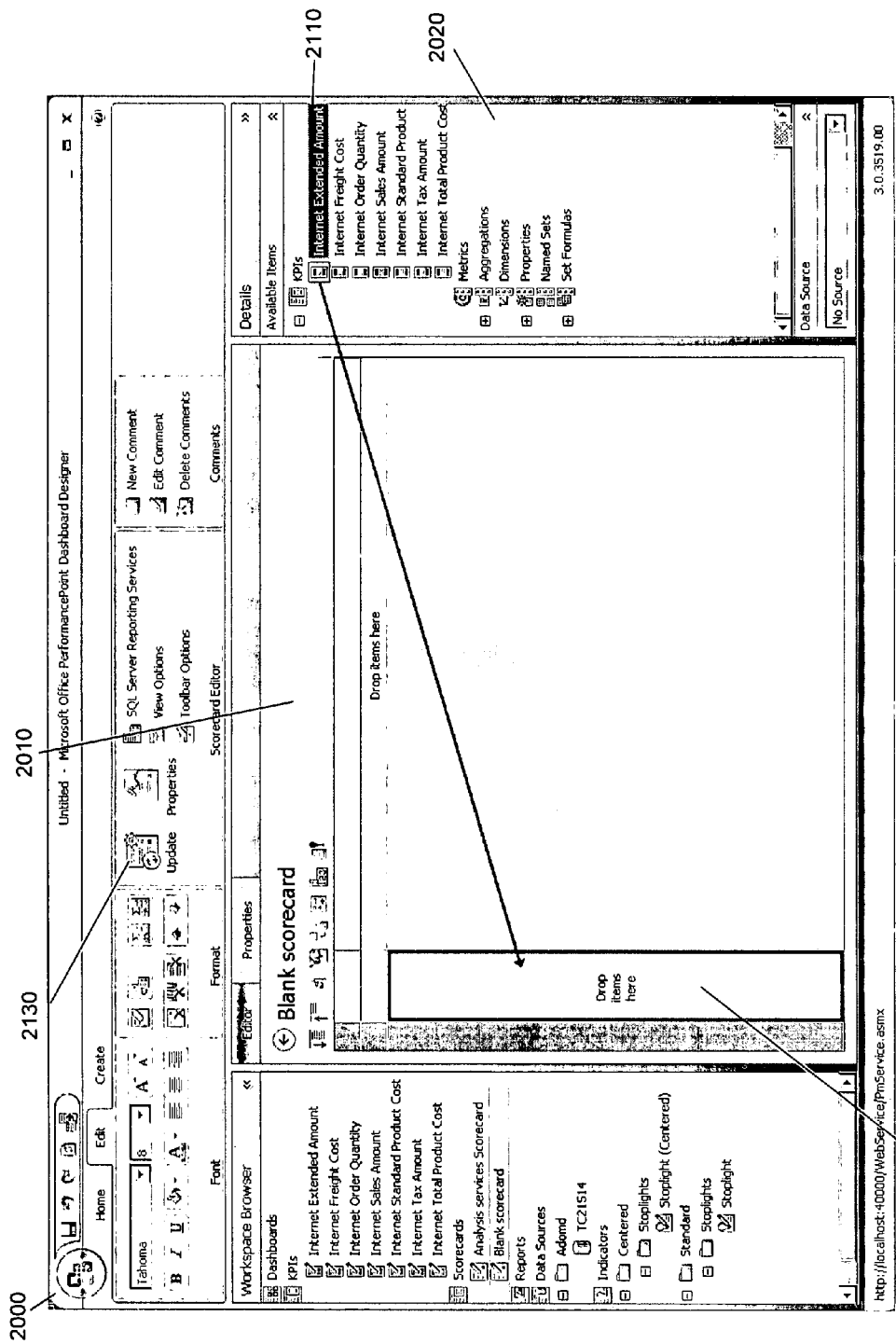
FIG. 21 shows the scorecard editor interface of FIG. 20 with a KPI element dragged onto a column area of a scorecard workspace.

For example, FIG. 21 shows that a KPI can be dragged and dropped from the items area 2020 to the scorecard workspace 2010. In this example, a KPI 2210 is dragged from the items area 2020 to the row area 2040 of the scorecard workspace 2010. When the KPIs are dragged and dropped onto the scorecard workspace 2010, the resulting rows and columns are initially blank. To update the KPIs and fill in the rows and columns with actual data from the data source, an update button 2130 is clicked. In alternative embodiments, the rows and columns in the scorecard workspace 2010 can be programmed to update automatically, or at periodic intervals. The user can drag and drop additional items such as KPIs in the scorecard workspace 2010 to complete the scorecard.

Figure 22:
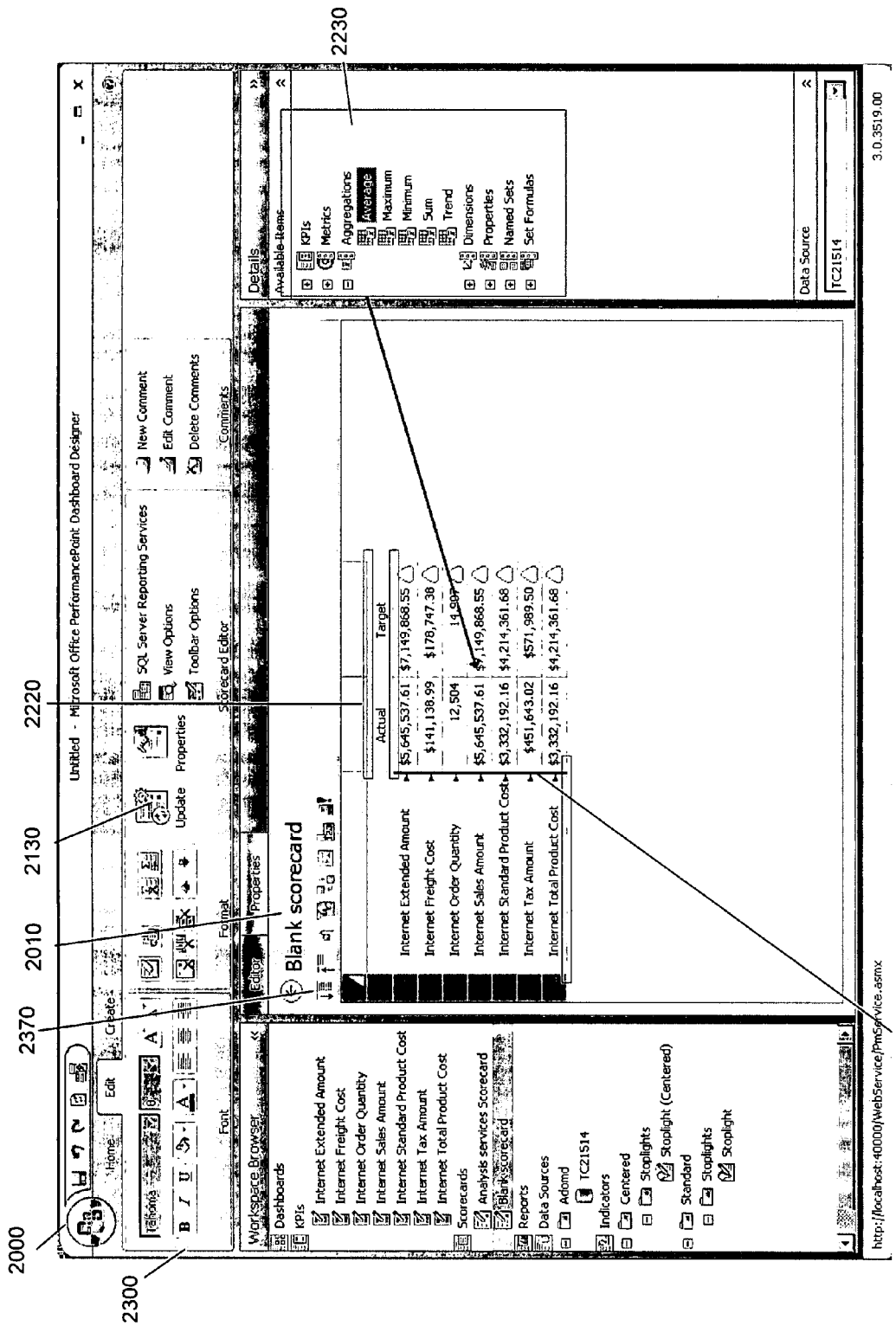
FIG. 22 shows the scorecard editor interface of FIG. 20 with a plurality of items dragged onto a scorecard workspace.

FIG. 22 shows the scorecard workspace 2010 after KPIs have been added and updated. The example KPIs 2210 are shown listed in one column and metrics 2220 associated with the KPIs, such as the Actual and Target values, are shown listed in adjacent columns. Metrics, aggregations, dimensions, properties, named sets, and formulas can be added to the scorecard workspace 2010 by dragging and dropping from the items area 2020 in a manner similar to that described above for KPIs. For example, aggregation metrics, shown as item 2230, can include Average, Maximum, Minimum, Sum, and Trend. When an aggregation metric is dropped onto the scorecard module, it can affect multiple rows and columns. For example, an aggregation metric placed at the end of a row or column calculates the average of the row or column when the user clicks the update button 2130.

In some embodiments, the scorecard editor interface 2000 is programmed to predict where an item from items area 2020, such as a KPI or aggregation, can be dropped on the scorecard workspace 2010. In such embodiments, the scorecard editor interface 2000 provides visual hints for the appropriate drop zones for particular item. For example, when a user drags an item from the items area 2020 into the scorecard workspace 2010, a blue line 2240 appears to the left of a column or at the bottom of a row to indicate where the item can be dropped. In the example shown, the blue line 2240 indicates than the average aggregation metric 2230 can be dropped into the Actual column 2220. Other configurations are possible.

Figure 23:
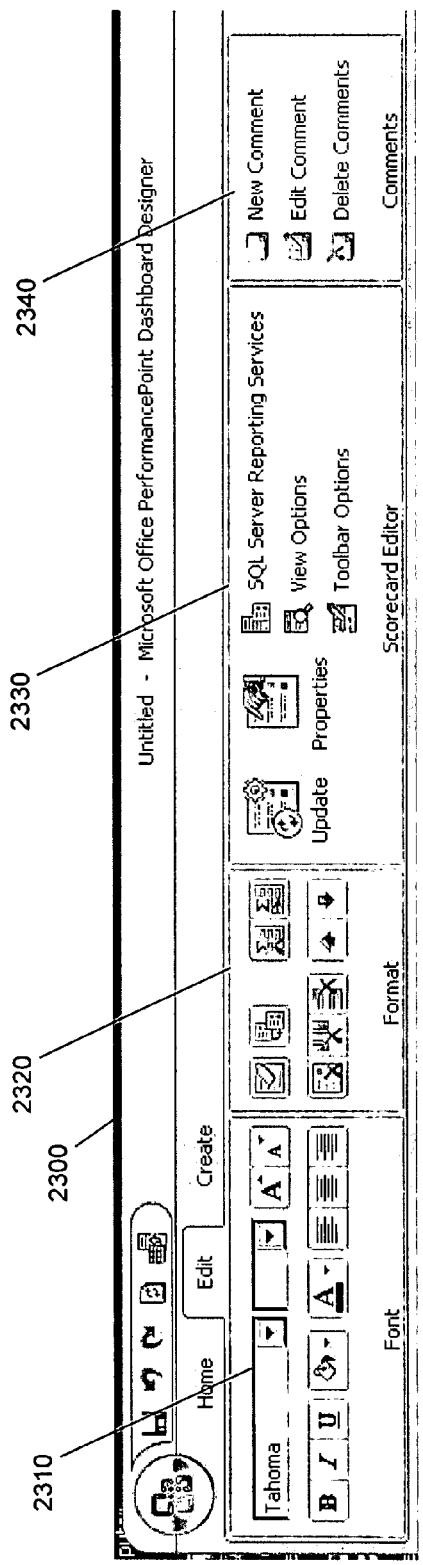
FIG. 23 shows an example ribbon of the scorecard editor interface of FIG. 20.

Referring now to FIG. 23, in example embodiments, the scorecard editor interface 2000 includes a ribbon 2300. The user can use control elements on the ribbon 2300 to alter the format of the scorecard. For example, the ribbon 2300 includes a font area 2310 including a plurality of control elements that can be used to change the format of the fonts of the scorecard, such as type face, pixel size, increase, decrease, bold, italic, underline, cell fill color, font color, left align, center, and right align. The ribbon 2300 includes a format area 2320 that is used to change the format of the scorecard, such as clear all formatting, pivot content, roll up to objective, remove roll up, delete all content from scorecard, delete all columns, delete all rows, move up, and move down. The ribbon 2300 also includes a scorecard format area 2330 including control elements that allow the user to format the scorecard, such as update content, properties, SQL server reporting services (deploys the scorecard to SQL reporting services), view options for scorecard, and toolbar options. Finally, the ribbon 2300 also includes a comments area 2340 that allows the user to provide comments for the scorecard, such as create, edit, and remove the comments attached to the cells in the scorecard.

Figure 24:
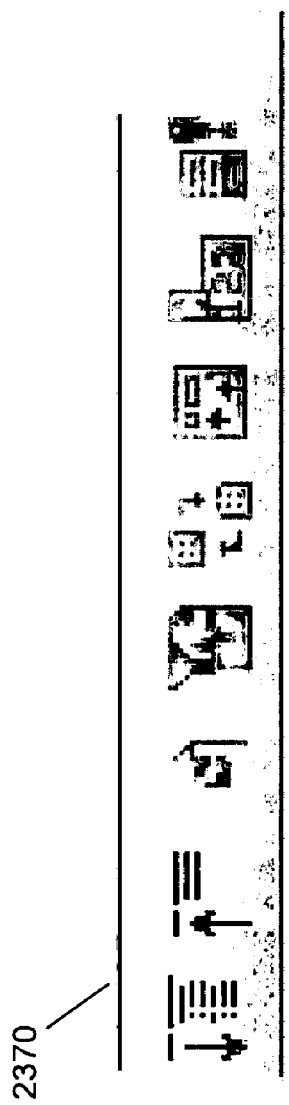
FIG. 24 shows an example toolbar of a scorecard workspace of the scorecard editor interface of FIG. 20.

Referring now to FIG. 24, the scorecard workspace 2010 also includes a scorecard toolbar 2370 including a plurality of control elements. The control elements can include, without limitation, change sorting up and down, flip columns and rows, and refresh. The toolbar 2370 is published with the scorecard so that the client can access the scorecard on the server can use the control elements in the toolbar 2370 to modify the format of the scorecard. The toolbar 2370 can be modified in the scorecard editor interface 2000 to change the control elements provided thereon.

In examples, the wizard and scorecard editor interface used to create the scorecard are application programs running on a computer system, such as the server 102 or the client 106 described above. Once the scorecard has been created, the scorecard can be published to a server so that it is accessible. For example, as described above, the scorecard can be published to the scorecard server 102 so that the client 106 can access the scorecard. In one example, a digital dashboard such as that disclosed in U.S. patent application Ser. No. 11/877,093, entitled "Dashboard Editor" and filed on even date herewith.

Figure 25:
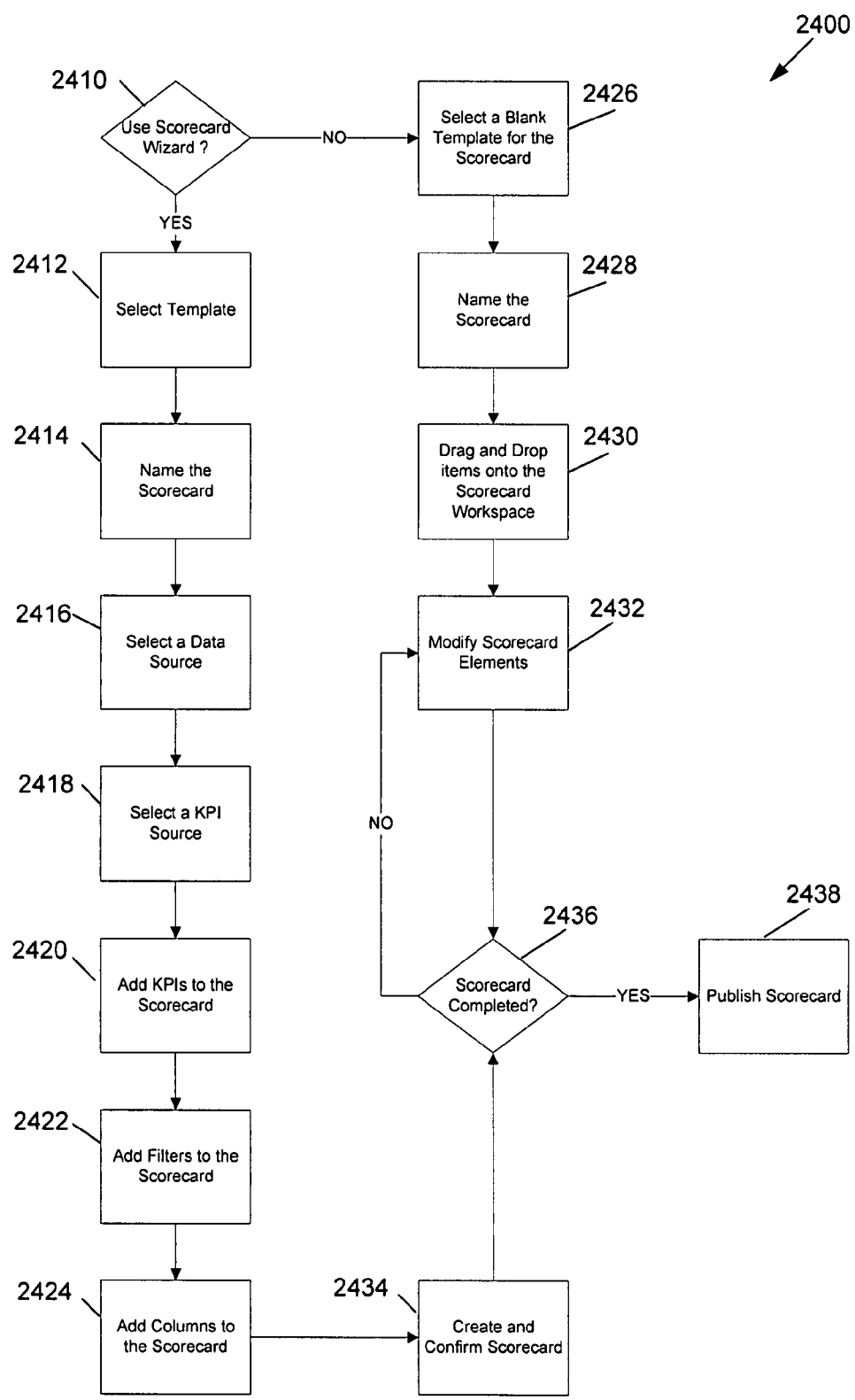
FIG. 25 shows an example method for creating a scorecard.

Referring now to FIG. 25, an example method 2400 is shown for creating a scorecard. In operation 2410, the user decides whether or not to create the scorecard using a wizard. If a wizard is used, a template for the scorecard is selected at operation 2412.

Next, at operation 2414, the wizard presents the user with a screen for naming the scorecard. At operation 2416, the wizard presents the user with a screen for selecting a data source for the scorecard. The availability of data sources can be made to be dependent upon the template selected.

Next at operation 2418, the user selects a KPI source for the KPIs. For certain data types, the wizard can create KPIs from the data or, in certain instances, such as Analysis Services, the wizard allows the user to import KPIs that have been defined in the data source itself.

At operation 2420, the user selects from the available KPIs and adds them to the scorecard. The available KPIs are presented to the user with any metrics, aggregations, etc. associated with the KPI.

At operation 2422, the wizard presents the user with a screen for adding filters to the scorecard. For example, totals can be filtered by a time period or by geography.

Next at operation 2424, the user is presented with a screen for adding columns to the scorecard. Columns are added by selecting dimensions and members for the selected dimension. Next, at operation 2434, the scorecard is created and confirmation is provided.

Next, at operation 2436, a determination is made as to whether or not the scorecard is complete. If the scorecard is complete, control is passed to operation 2438, and the scorecard is published. Alternatively, if the scorecard is not complete, control is passed to operation 2432, which is described below.

Returning to operation 2410, if the user selects not to use a wizard, control is passed to operation 2426 and the user selects a template and manually creates the scorecard. At operation 2428, a name is selected for the scorecard.

At operation 2430, the user drags and drops items, such as KPIs and filters, from the items area of the scorecard editor interface onto the scorecard workspace. The scorecard workspace contains rows and columns where the items can be dragged and dropped.

Next, at operation 2432, the user modifies the scorecard elements by changing formatting and/or by adding other items such as additional KPIs, metrics, aggregations, dimensions, properties, named sets, and formulas to the scorecard. Control is then passed to operation 2436, which is described above.

Figure 26:
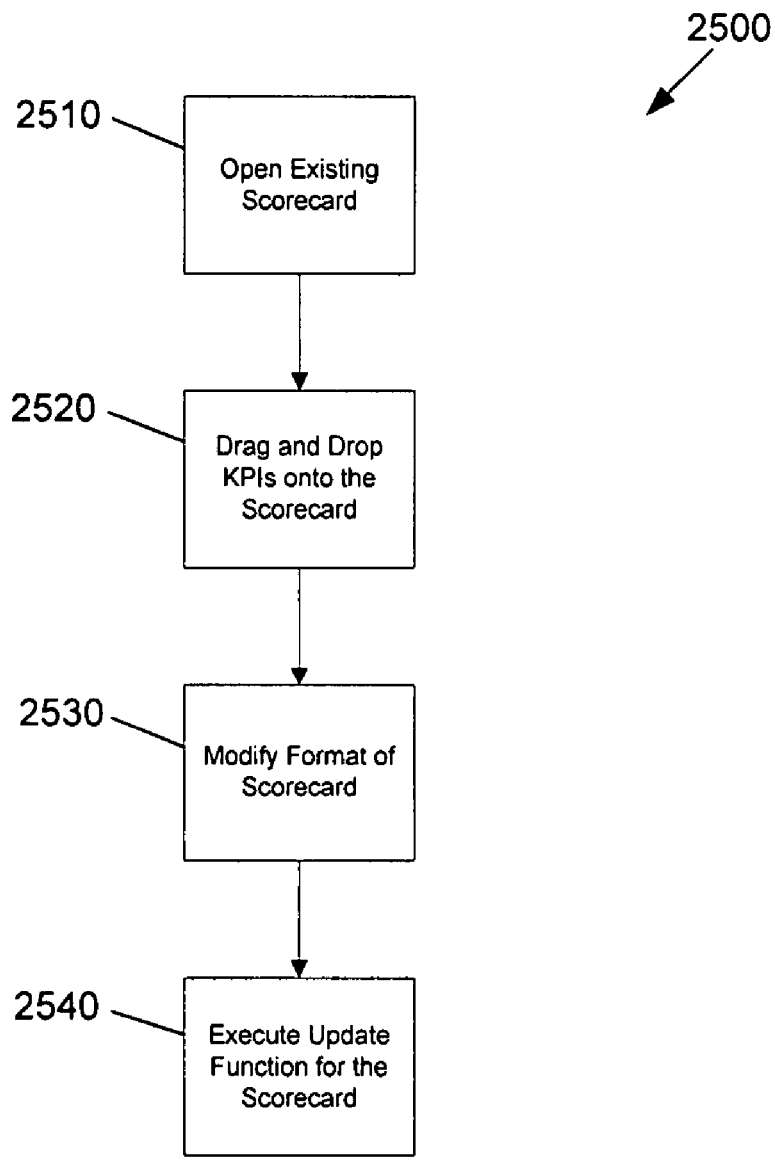
FIG. 26 shows an example method for editing a scorecard.

FIG. 26 shows an example method 2500 for editing an existing scorecard. The scorecard is opened in operation 2510. Additional items such as KPIs or filters are dragged and dropped onto the scorecard workspace at operation 2520. The formatting of the scorecard is then modified at operation 2530. Finally, the user updates the scorecard at operation 2540, typically by clicking on an update button. The execution of the update function results in updated totals from the data source being reflected in the rows and columns of the scorecard.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for creating a key performance indicator scorecard using a wizard, the method comprising:

displaying a template interface on a computing device, the template interface including at least one template that defines pre-configured layouts for the key performance indicator scorecard, a categories module that enables selection from a plurality of templates, a template module that lists available templates based on a selected category in the categories module, and an option checkbox that, when selected, enables the wizard to assist a user in creating the key performance indicator scorecard;

receiving selection within the option checkbox of the template interface to enable the wizard;

displaying a first screen in the wizard on the computing device including the plurality of templates;

receiving a first selection in the first screen of one of the plurality of templates;

displaying a second screen in the wizard on the computing device including a plurality of data sources;

receiving a second selection in the second screen of one of the plurality of data sources;

displaying a third screen in the wizard on the computing device including a plurality of key performance indicators at least relating to the one selected data source;

receiving a third selection in the third screen of one of the plurality of key performance indicators, wherein the third selection comprises the one of the plurality of key performance indicators being dragged and dropped onto an area of the scorecard designated by a visual cue positioned immediately adjacent thereto;

allowing for at least one of: an actual value to be set for the one of the plurality of key performance indicators in the wizard; one or more targets to be set for the one of the plurality of key performance indicators in the wizard; and a tracking band to be defined for the one of the plurality of key performance indicators in the wizard;

displaying a fourth screen in the wizard on the computing device including a plurality of measure filters that can be applied to the one of the plurality of key performance indicators;

receiving a selection in the fourth screen of one of the plurality of measure filters, the selection chosen between an actual measure filter configured to generate a current value of the one of the key performance indicators and a target measure filter configured to generate an expected future value of the one of the key performance indicators based on a formula input; and displaying a fifth screen in the wizard on the computing device including a plurality of columns associated with the one of the plurality of key performance indicators.

* * * * *